US011620663B2

(12) United States Patent
Rachamadugu

(10) Patent No.: US 11,620,663 B2
(45) Date of Patent: Apr. 4, 2023

(54) NETWORK PROFILE GENERATION

(71) Applicant: Oath Inc., New York, NY (US)

(72) Inventor: Sreenivas Rachamadugu, Broadlands, VA (US)

(73) Assignee: YAHOO AD TECH LLC, New York, NY (US)

( * ) Notice: Subject to any disclaimer, the term of this patent is extended or adjusted under 35 U.S.C. 154(b) by 13 days.

(21) Appl. No.: 16/731,113

(22) Filed: Dec. 31, 2019

(65) Prior Publication Data

US 2021/0201333 A1 Jul. 1, 2021

(51) Int. Cl.
*H04L 67/30* (2022.01)
*H04L 67/50* (2022.01)
*G06Q 30/0201* (2023.01)
*G06Q 30/0242* (2023.01)
*G06Q 50/00* (2012.01)

(52) U.S. Cl.
CPC ......... *G06Q 30/0201* (2013.01); *H04L 67/30* (2013.01); *H04L 67/535* (2022.05); *G06Q 30/0242* (2013.01); *G06Q 50/01* (2013.01)

(58) Field of Classification Search
CPC ........ G06Q 50/01; G06Q 30/02; H04L 51/32; H04L 67/22; H04L 67/302; H04W 4/21
See application file for complete search history.

(56) References Cited

U.S. PATENT DOCUMENTS

| | | | |
|---|---|---|---|
| 2015/0199752 A1* | 7/2015 | Sherman | G06Q 30/00 705/319 |
| 2017/0255761 A1* | 9/2017 | Fushman | H04L 67/535 |
| 2018/0091478 A1* | 3/2018 | Jakobsson | H04L 63/1441 |
| 2018/0295146 A1* | 10/2018 | Kovega | H04L 63/1425 |
| 2019/0035007 A1* | 1/2019 | Yepez | G06Q 50/01 |
| 2019/0311418 A1* | 10/2019 | Pandit | G06Q 50/01 |
| 2019/0349619 A1* | 11/2019 | Hou | H04N 21/251 |
| 2020/0053111 A1* | 2/2020 | Jakobsson | H04L 63/1416 |

OTHER PUBLICATIONS

Tang et al, Social Influence Analysis in Large-scale Networks, Jul. 2009, Association of Computing Machinery, Proceeding of the 15th ACM SIGKDD conference, pp. 808-816, retrieved from internet Nov. 11, 2020 (Year: 2009).*
Rao et al , Klout score: Measuring influence across multiple social networks, Nov. 2015, IEEE, IEE Xplore:Dec. 28, 2015, pp. 2282-2289, retrieved from internet Nov. 11, 2020 (Year: 2015).*

\* cited by examiner

*Primary Examiner* — Tom Y Chang
(74) *Attorney, Agent, or Firm* — Cooper Legal Group LLC

(57) ABSTRACT

One or more computing devices, systems, and/or methods are provided. Activity of a plurality of devices may be analyzed to identify network traffic. A network profile associated with the plurality of devices may be generated based upon the network traffic. The network profile may be indicative of one or more sets of transmission metrics associated with a first device of the plurality of devices. The network profile may be indicative of one or more sets of reception metrics associated with the first device. Content may be generated based upon the network profile. The content may be transmitted to a device based upon the network profile.

20 Claims, 12 Drawing Sheets

NETWORK PROFILE GENERATION

BACKGROUND

A user may communicate with other users such as by using one or more interfaces (e.g., one or more mobile applications), such as a messaging interface, a social media interface, an email interface, a telephone call, etc. A device (e.g., a server, a mobile device, a sensor, etc.) may communicate with other devices by using one or more interfaces (e.g., Application Programming Interface (API) calls, service, microservice calls, broadcast, multicast, etc.) and/or signals.

SUMMARY

In accordance with the present disclosure, one or more computing devices and/or methods are provided. In an example, activity of a plurality of devices and/or a plurality of nodes (e.g., a node of the plurality of nodes corresponds to a device and/or a node of the plurality of nodes corresponds to one or more devices associated with a user and/or a user account) may be analyzed to identify network traffic. The network traffic may comprise transmission of data by a first device to one or more first devices and/or reception of data by the first device from one or more second devices. A network profile associated with the plurality of devices may be generated based upon the network traffic. The network profile may be indicative of one or more sets of transmission metrics associated with the first device. A first set of transmission metrics of the one or more sets of transmission metrics corresponds to a measure of transmissions of data, of the network traffic, to a second device of the one or more first devices. The network profile may be indicative of one or more sets of reception metrics associated with the first device. A first set of reception metrics of the one or more sets of reception metrics corresponds to a measure of receptions of data, of the network traffic, from a third device of the one or more second devices. Content may be generated based upon the network profile. The content may be transmitted to a fourth device based upon the network profile.

In an example, activity of a plurality of devices and/or a plurality of nodes (e.g., a node of the plurality of nodes corresponds to a device and/or a node of the plurality of nodes corresponds to one or more devices associated with a user and/or a user account) may be analyzed to identify network traffic. The network traffic may comprise transmission of data by a first device to one or more first devices and/or reception of data by the first device from one or more second devices. A network profile associated with the plurality of devices may be generated based upon the network traffic. The network profile may be indicative of one or more sets of transmission metrics associated with the first device. A first set of transmission metrics of the one or more sets of transmission metrics corresponds to a measure of transmissions of data, of the network traffic, to a second device of the one or more first devices. The network profile may be indicative of one or more sets of reception metrics associated with the first device. A first set of reception metrics of the one or more sets of reception metrics corresponds to a measure of receptions of data, of the network traffic, from a third device of the one or more second devices. An influence score associated with the first device and the third device may be determined based upon the network profile. A content item may be selected for presentation via the third device based upon the influence score. The content item may be transmitted to the third device.

In an example, activity of a plurality of devices and/or a plurality of nodes (e.g., a node of the plurality of nodes corresponds to a device and/or a node of the plurality of nodes corresponds to one or more devices associated with a user and/or a user account) may be analyzed to identify network traffic. The network traffic may comprise transmission of data by a first device to one or more first devices and/or reception of data by the first device from one or more second devices. A network profile associated with the plurality of devices may be generated based upon the network traffic. The network profile may be indicative of one or more sets of transmission metrics associated with the first device. A first set of transmission metrics of the one or more sets of transmission metrics corresponds to a measure of transmissions of data, of the network traffic, to a second device of the one or more first devices. The network profile may be indicative of one or more sets of reception metrics associated with the first device. A first set of reception metrics of the one or more sets of reception metrics corresponds to a measure of receptions of data, of the network traffic, from a third device of the one or more second devices. The network profile may be analyzed to determine a first activity pattern associated with the first device. Second activity associated with the first device may be monitored. The second activity may be compared with the first activity pattern to determine a difference between the second activity and the first activity pattern. A threat level associated with the second activity may be determined based upon the difference. A notification may be generated based upon the threat level. The notification may be transmitted to the first device and/or a fourth device, such as a listener that monitors activity associated with the first device.

DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

DETAILED DESCRIPTION

Subject matter will now be described more fully hereinafter with reference to the accompanying drawings, which form a part hereof, and which show, by way of illustration, specific example embodiments. This description is not intended as an extensive or detailed discussion of known concepts. Details that are known generally to those of ordinary skill in the relevant art may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

1. Computing Scenario

Figure 1:
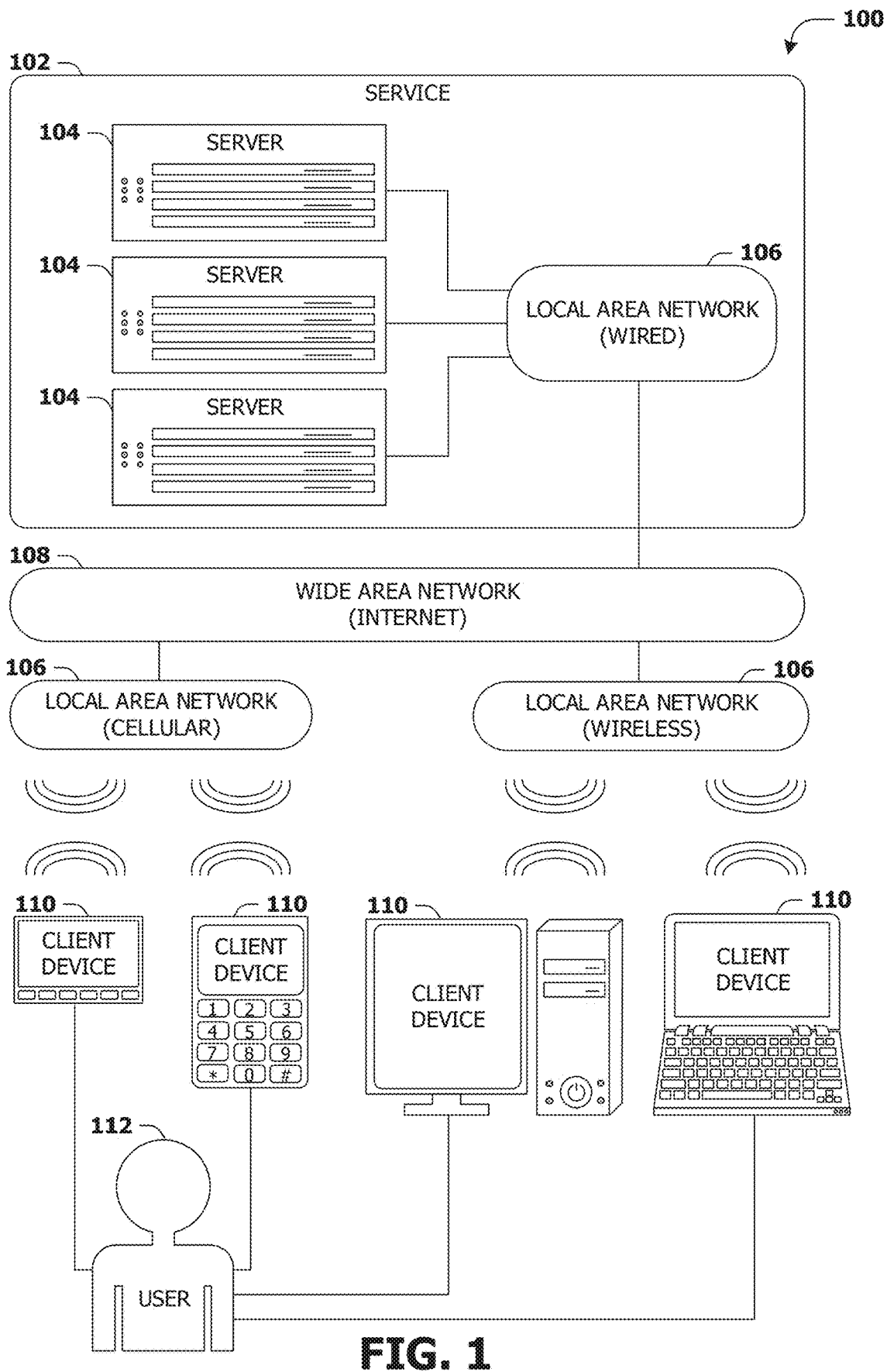
FIG. 1 is an illustration of a scenario involving various examples of networks that may connect servers and clients.

The following provides a discussion of some types of computing scenarios in which the disclosed subject matter may be utilized and/or implemented.
1.1. Networking FIG. 1 is an interaction diagram of a scenario 100 illustrating a service 102 provided by a set of servers 104 to a set of client devices 110 via various types of networks. The servers 104 and/or client devices 110 may be capable of transmitting, receiving, processing, and/or storing many types of signals, such as in memory as physical memory states.

The servers 104 of the service 102 may be internally connected via a local area network 106 (LAN), such as a wired network where network adapters on the respective servers 104 are interconnected via cables (e.g., coaxial and/or fiber optic cabling), and may be connected in various topologies (e.g., buses, token rings, meshes, and/or trees). The servers 104 may be interconnected directly, or through one or more other networking devices, such as routers, switches, and/or repeaters. The servers 104 may utilize a variety of physical networking protocols (e.g., Ethernet and/or Fiber Channel) and/or logical networking protocols (e.g., variants of an Internet Protocol (IP), a Transmission Control Protocol (TCP), and/or a User Datagram Protocol (UDP). The local area network 106 may include, e.g., analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. The local area network 106 may be organized according to one or more network architectures, such as server/client, peer-to-peer, and/or mesh architectures, and/or a variety of roles, such as administrative servers, authentication servers, security monitor servers, data stores for objects such as files and databases, business logic servers, time synchronization servers, and/or front-end servers providing a user-facing interface for the service 102.

Likewise, the local area network 106 may comprise one or more sub-networks, such as may employ differing architectures, may be compliant or compatible with differing protocols and/or may interoperate within the local area network 106. Additionally, a variety of local area networks 106 may be interconnected; e.g., a router may provide a link between otherwise separate and independent local area networks 106.

In the scenario 100 of FIG. 1, the local area network 106 of the service 102 is connected to a wide area network 108 (WAN) that allows the service 102 to exchange data with other services 102 and/or client devices 110. The wide area network 108 may encompass various combinations of devices with varying levels of distribution and exposure, such as a public wide-area network (e.g., the Internet) and/or a private network (e.g., a virtual private network (VPN) of a distributed enterprise).

In the scenario 100 of FIG. 1, the service 102 may be accessed via the wide area network 108 by a user 112 of one or more client devices 110, such as a portable media player (e.g., an electronic text reader, an audio device, or a portable gaming, exercise, or navigation device); a portable communication device (e.g., a camera, a phone, a wearable or a text chatting device); a workstation; and/or a laptop form factor computer. The respective client devices 110 may communicate with the service 102 via various connections to the wide area network 108. As a first such example, one or more client devices 110 may comprise a cellular communicator and may communicate with the service 102 by connecting to the wide area network 108 via a wireless local area network 106 provided by a cellular provider. As a second such example, one or more client devices 110 may communicate with the service 102 by connecting to the wide area network 108 via a wireless local area network 106 provided by a location such as the user's home or workplace (e.g., a WiFi (Institute of Electrical and Electronics Engineers (IEEE)

Standard 802.11) network or a Bluetooth (IEEE Standard 802.15.1) personal area network). In this manner, the servers 104 and the client devices 110 may communicate over various types of networks. Other types of networks that may be accessed by the servers 104 and/or client devices 110 include mass storage, such as network attached storage (NAS), a storage area network (SAN), or other forms of computer or machine readable media.

1.2. Server Configuration

Figure 2:
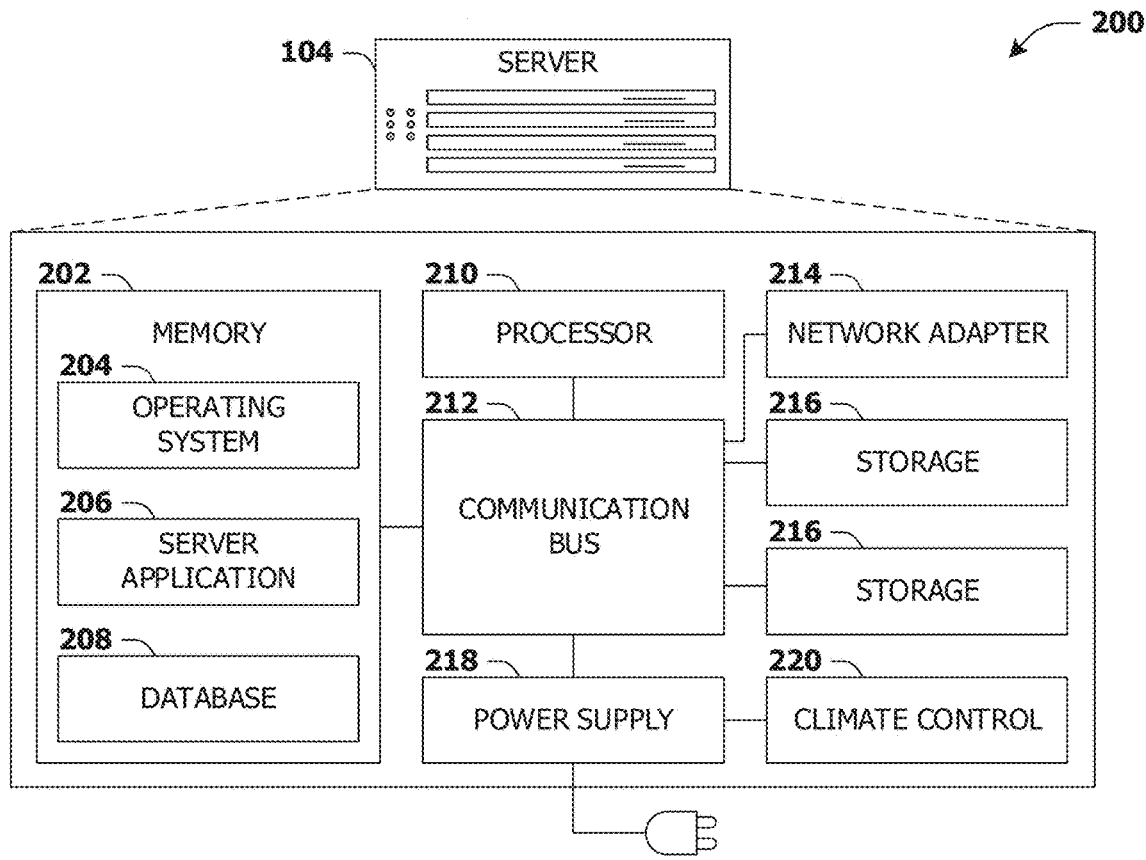
FIG. 2 is an illustration of a scenario involving an example configuration of a server that may utilize and/or implement at least a portion of the techniques presented herein.

FIG. 2 presents a schematic architecture diagram 200 of a server 104 that may utilize at least a portion of the techniques provided herein. Such a server 104 may vary widely in configuration or capabilities, alone or in conjunction with other servers, in order to provide a service such as the service 102.

The server 104 may comprise one or more processors 210 that process instructions. The one or more processors 210 may optionally include a plurality of cores; one or more coprocessors, such as a mathematics coprocessor or an integrated graphical processing unit (GPU); and/or one or more layers of local cache memory. The server 104 may comprise memory 202 storing various forms of applications, such as an operating system 204; one or more server applications 206, such as a hypertext transport protocol (HTTP) server, a file transfer protocol (FTP) server, or a simple mail transport protocol (SMTP) server; and/or various forms of data, such as a database 208 or a file system. The server 104 may comprise a variety of peripheral components, such as a wired and/or wireless network adapter 214 connectible to a local area network and/or wide area network; one or more storage components 216, such as a hard disk drive, a solid-state storage device (SSD), a flash memory device, and/or a magnetic and/or optical disk reader.

The server 104 may comprise a mainboard featuring one or more communication buses 212 that interconnect the processor 210, the memory 202, and various peripherals, using a variety of bus technologies, such as a variant of a serial or parallel AT Attachment (ATA) bus protocol; a Uniform Serial Bus (USB) protocol; and/or Small Computer System Interface (SCI) bus protocol. In a multibus scenario, a communication bus 212 may interconnect the server 104 with at least one other server. Other components that may optionally be included with the server 104 (though not shown in the schematic diagram 200 of FIG. 2) include a display; a display adapter, such as a graphical processing unit (GPU); input peripherals, such as a keyboard and/or mouse; and a flash memory device that may store a basic input/output system (BIOS) routine that facilitates booting the server 104 to a state of readiness.

The server 104 may operate in various physical enclosures, such as a desktop or tower, and/or may be integrated with a display as an "all-in-one" device. The server 104 may be mounted horizontally and/or in a cabinet or rack, and/or may simply comprise an interconnected set of components. The server 104 may comprise a dedicated and/or shared power supply 218 that supplies and/or regulates power for the other components. The server 104 may provide power to and/or receive power from another server and/or other devices. The server 104 may comprise a shared and/or dedicated climate control unit 220 that regulates climate properties, such as temperature, humidity, and/or airflow. Many such servers 104 may be configured and/or adapted to utilize at least a portion of the techniques presented herein.

1.3. Client Device Configuration

Figure 3:
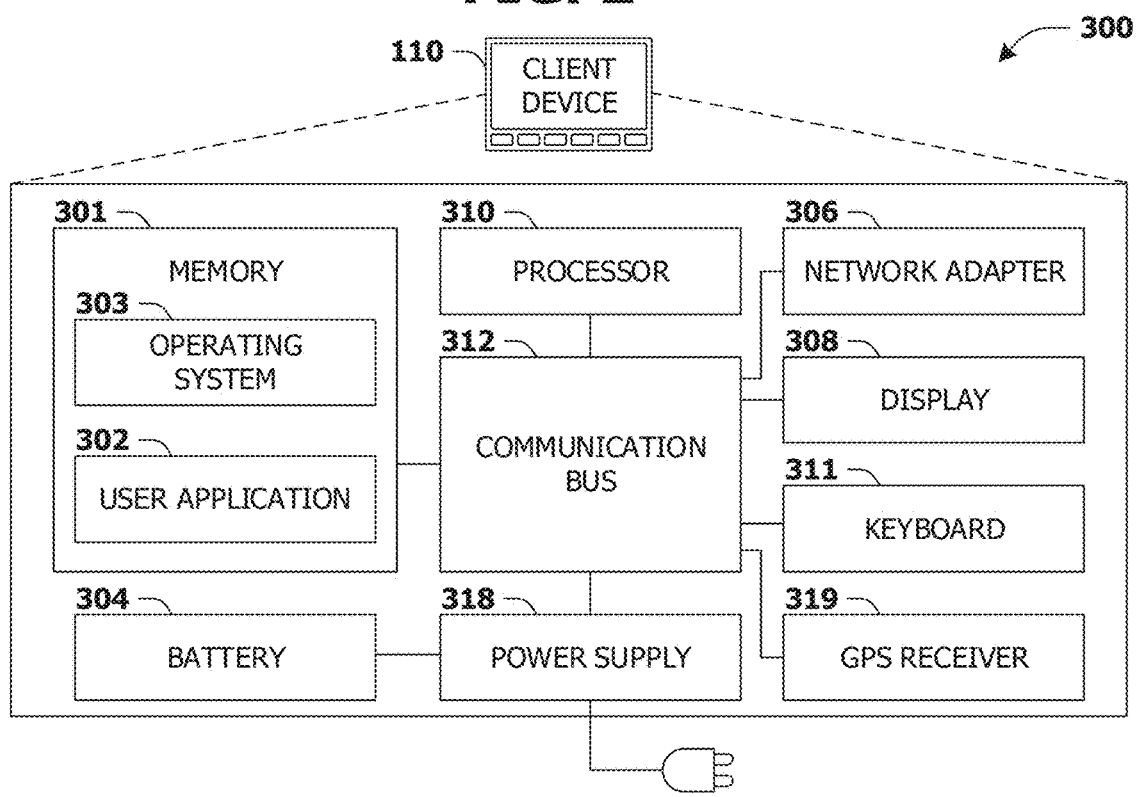
FIG. 3 is an illustration of a scenario involving an example configuration of a client that may utilize and/or implement at least a portion of the techniques presented herein.

FIG. 3 presents a schematic architecture diagram 300 of a client device 110 whereupon at least a portion of the techniques presented herein may be implemented. Such a client device 110 may vary widely in configuration or capabilities, in order to provide a variety of functionality to a user such as the user 112. The client device 110 may be provided in a variety of form factors, such as a desktop or tower workstation; an "all-in-one" device integrated with a display 308; a laptop, tablet, convertible tablet, or palmtop device; a wearable device mountable in a headset, eyeglass, earpiece, and/or wristwatch, and/or integrated with an article of clothing; and/or a component of a piece of furniture, such as a tabletop, and/or of another device, such as a vehicle or residence. The client device 110 may serve the user in a variety of roles, such as a workstation, kiosk, media player, gaming device, and/or appliance.

The client device 110 may comprise one or more processors 310 that process instructions. The one or more processors 310 may optionally include a plurality of cores; one or more coprocessors, such as a mathematics coprocessor or an integrated graphical processing unit (GPU); and/or one or more layers of local cache memory. The client device 110 may comprise memory 301 storing various forms of applications, such as an operating system 303; one or more user applications 302, such as document applications, media applications, file and/or data access applications, communication applications such as web browsers and/or email clients, utilities, and/or games; and/or drivers for various peripherals. The client device 110 may comprise a variety of peripheral components, such as a wired and/or wireless network adapter 306 connectible to a local area network and/or wide area network; one or more output components, such as a display 308 coupled with a display adapter (optionally including a graphical processing unit (GPU)), a sound adapter coupled with a speaker, and/or a printer; input devices for receiving input from the user, such as a keyboard 311, a mouse, a microphone, a camera, and/or a touch-sensitive component of the display 308; and/or environmental sensors, such as a global positioning system (GPS) receiver 319 that detects the location, velocity, and/or acceleration of the client device 110, a compass, accelerometer, and/or gyroscope that detects a physical orientation of the client device 110. Other components that may optionally be included with the client device 110 (though not shown in the schematic architecture diagram 300 of FIG. 3) include one or more storage components, such as a hard disk drive, a solid-state storage device (SSD), a flash memory device, and/or a magnetic and/or optical disk reader; and/or a flash memory device that may store a basic input/output system (BIOS) routine that facilitates booting the client device 110 to a state of readiness; and a climate control unit that regulates climate properties, such as temperature, humidity, and airflow.

The client device 110 may comprise a mainboard featuring one or more communication buses 312 that interconnect the processor 310, the memory 301, and various peripherals, using a variety of bus technologies, such as a variant of a serial or parallel AT Attachment (ATA) bus protocol; the Uniform Serial Bus (USB) protocol; and/or the Small Computer System Interface (SCI) bus protocol. The client device 110 may comprise a dedicated and/or shared power supply 318 that supplies and/or regulates power for other components, and/or a battery 304 that stores power for use while the client device 110 is not connected to a power source via the power supply 318. The client device 110 may provide power to and/or receive power from other client devices.

In some scenarios, as a user 112 interacts with a software application on a client device 110 (e.g., an instant messenger and/or electronic mail application), descriptive content in the form of signals or stored physical states within memory (e.g., an email address, instant messenger identifier, phone number, postal address, message content, date, and/or time) may be identified. Descriptive content may be stored, typically along with contextual content. For example, the source of a phone number (e.g., a communication received from another user via an instant messenger application) may be stored as contextual content associated with the phone number. Contextual content, therefore, may identify circumstances surrounding receipt of a phone number (e.g., the date or time that the phone number was received), and may be associated with descriptive content. Contextual content, may, for example, be used to subsequently search for associated descriptive content. For example, a search for phone numbers received from specific individuals, received via an instant messenger application or at a given date or time, may be initiated. The client device 110 may include one or more servers that may locally serve the client device 110 and/or other client devices of the user 112 and/or other individuals. For example, a locally installed webserver may provide web content in response to locally submitted web requests. Many such client devices 110 may be configured and/or adapted to utilize at least a portion of the techniques presented herein.

2. Presented Techniques

One or more computing devices and/or techniques for generating a network profile associated with devices and/or transmitting content to devices based upon the network profile are provided. In an example, a content system may present one or more content items via client devices. The one or more content items may be associated with a first entity and/or associated with one or more products, one or more services, etc. associated with the first entity. For example, the one or more content items may be associated with a content campaign (e.g., an advertisement campaign) for promoting the one or more products and/or the one or more services associated with the first entity. In an example, a first content item of the one or more content items may be selected for transmission to a first client device. However, selection of the first content item may be performed without taking into account how the first client device communicates with other client devices and/or an influence that data transmitted by the first client device to a client device has on a user of the client device. For example, the first client device may not regularly transmit data to other client devices and/or data transmitted by the first client device to other client devices may not have an influence on users of the other client devices. Accordingly, transmission of the first content item to the first client device may not have an effect (e.g., a positive effect) on other users associated with the other client devices.

Thus, in accordance with one or more of the techniques presented herein, activity of a plurality of devices may be analyzed to identify network traffic. The network traffic may comprise transmission of data by a first device to one or more first devices and/or reception of data by the first device from one or more second devices. A network profile associated with the plurality of devices may be generated based upon the network traffic. The network profile may be indicative of one or more sets of transmission metrics associated with the first device. A first set of transmission metrics of the one or more sets of transmission metrics may correspond to a measure of transmissions of data, of the network traffic, to a second device of the one or more first devices. The network profile may be indicative of one or more sets of reception metrics associated with the first device. A first set of reception metrics of the one or more sets of reception metrics may correspond to a measure of receptions of data, of the network traffic, from a third device of the one or more second devices. An influence score associated with the first device and the third device may be determined based upon the network profile. In some examples, the influence score is indicative of an amount of influence that data transmitted from the third device to the first device has on a user of the first device. A content item may be selected for presentation via the third device based upon the influence score. The content item may be transmitted to the third device.

Figure 4:
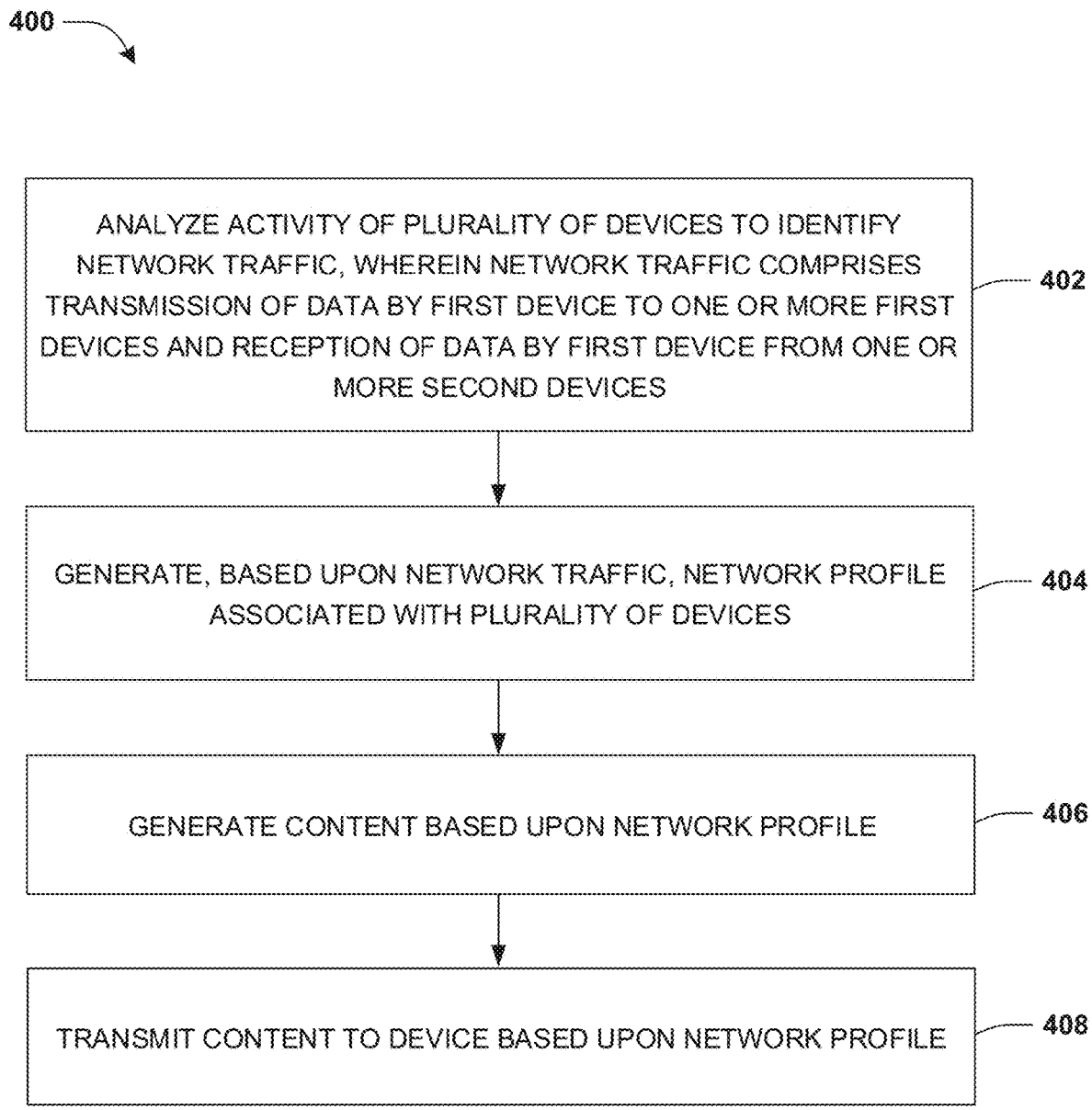
FIG. 4 is a flow chart illustrating an example method for generating a network profile associated with devices and/or transmitting content to devices based upon the network profile.

An embodiment of generating a network profile associated with devices and/or transmitting content to devices based upon the network profile is illustrated by an example method 400 of FIG. 4. In some examples, a network system for analyzing activity of devices may be provided. The network system may be associated with an internet service provider (ISP) providing one or more services for the devices to perform one or more functions. For example, the one or more functions may comprise accessing and/or using resources provided by host devices (e.g., servers) associated with applications (e.g., mobile applications) and/or web pages. Alternatively and/or additionally, the one or more functions may comprise performing communications with other devices (e.g., transmitting data to a device and/or receiving data from a device), such as a user calling a different user, a user messaging a different user, a user emailing a different user, a user posting a social media post on a social media platform for various users to consume, etc.

At 402, first activity of a plurality of devices and/or a plurality of nodes may be analyzed to identify first network traffic. A node of the plurality of nodes may correspond to a device of the plurality of devices. Alternatively and/or additionally, a node of the plurality of nodes may correspond a user and/or a user account (e.g., the node may correspond to one or more devices associated with the user and/or the user account). In some examples, the first activity may comprise activity performed by devices of the plurality of devices (and/or nodes of the plurality of nodes) during a first period of time (e.g., at least one of a day, a week, a month, etc.). In some examples, the first activity may comprise a plurality of sets of activity. For example, each set of activity of the plurality of sets of activity may be associated with one or more devices of the plurality of devices (and/or a node of the plurality of nodes).

The plurality of devices may comprise a first device. The first activity may comprise a first set of activity associated with the first device. The first set of activity may comprise one or more selections of one or more selectable inputs of an interface, such as at least one of a communication interface (e.g., a messaging interface, an email interface, a social media interface, a cellular interface for making calls and/or sending text messages, etc.), a content interface (e.g., an interface for accessing and/or consuming news articles, blog posts, audio, video, etc.), etc.

Alternatively and/or additionally, the first set of activity may be associated with multiple devices corresponding to a first node. For example, a first set of devices, comprising the first device, may be associated with a first user of the first device. Alternatively and/or additionally, the first set of devices may be associated with a first user account associated with a service (e.g., each device of the first set of devices may be logged into the first user account associated with the service, such as a communication service, a content service, etc.). The first set of activity may comprise activity performed by the first set of devices associated with the first user account. For example, activity performed by the first set of devices may be included in the first set of activity.

In some examples, the first network traffic may comprise network traffic associated with the first activity. For example, the first network traffic may comprise network traffic associated with the first set of activity. For example, the first network traffic may comprise transmission of data (e.g., messages, emails, social media posts, audio, video and/or other types of information) by the first device (and/or a different device of the first set of devices) to one or more first devices (e.g., the plurality of devices may comprise the one or more first devices). Alternatively and/or additionally, the first network traffic may comprise reception of data (e.g., messages, emails, social media posts, audio, video and/or other types of information) by the first device (and/or a different device of the first set of devices) from one or more second devices (e.g., the plurality of devices may comprise the one or more second devices).

In some examples, the one or more first devices may be the same as the one or more second devices. Alternatively and/or additionally, the one or more first devices may be different than the one or more second devices. Alternatively and/or additionally, one or more devices may be common to the one or more first devices and the one or more second devices (e.g., the first device may transmit data to the one or more devices and/or receive data from the one or more devices).

In some examples, one or more devices of the plurality of devices may correspond to one or more client devices, such as a computer, a phone, a smartphone, a laptop, a tablet, a wearable device and/or a different type of client device. Alternatively and/or additionally, one or more devices of the plurality of devices may correspond to one or more host devices. In an example, a host device of the one or more host devices may be configured to host one or more components (e.g., an application, a mobile application, a client application, a web page, a platform, a caching component used to cache data of a service, a microservice, etc.) of one or more services. For example, a host device of the one or more host devices may comprise a server (and/or one or more servers of a data center) configured to host one or more components of one or more services, such as through compute instances (e.g., virtual machines). Alternatively and/or additionally, a host device of the one or more host devices may comprise one or more computing devices, storage and/or a network maintained by a provider of a service. In an example, a host device of the one or more host devices may comprise one or more computing devices and/or storage on a network cloud associated with a provider of a service. Alternatively and/or additionally, a host device of the one or more host devices may comprise one or more computing devices and/or storage on a network edge associated with the provider. Alternatively and/or additionally, a host device of the one or more network devices may comprise one or more computing devices and/or storage on a network core associated with the provider. Alternatively and/or additionally, a host device of the one or more host devices may comprise a computing system at a network node, such as a cellular base station and/or an edge node.

FIGS. 5A-5H illustrate examples of a system 501 for generating a network profile associated with devices and/or transmitting content to devices based upon the network profile, described with respect to the example method 400 of FIG. 4. In an example, the first device may correspond to a first client device 500 (e.g., a smartphone, a tablet and/or a different type of client device). The first user and/or the first client device 500 may access and/or interact with the first client device 500 to communicate with other users and/or to consume content.

Figure 5A:
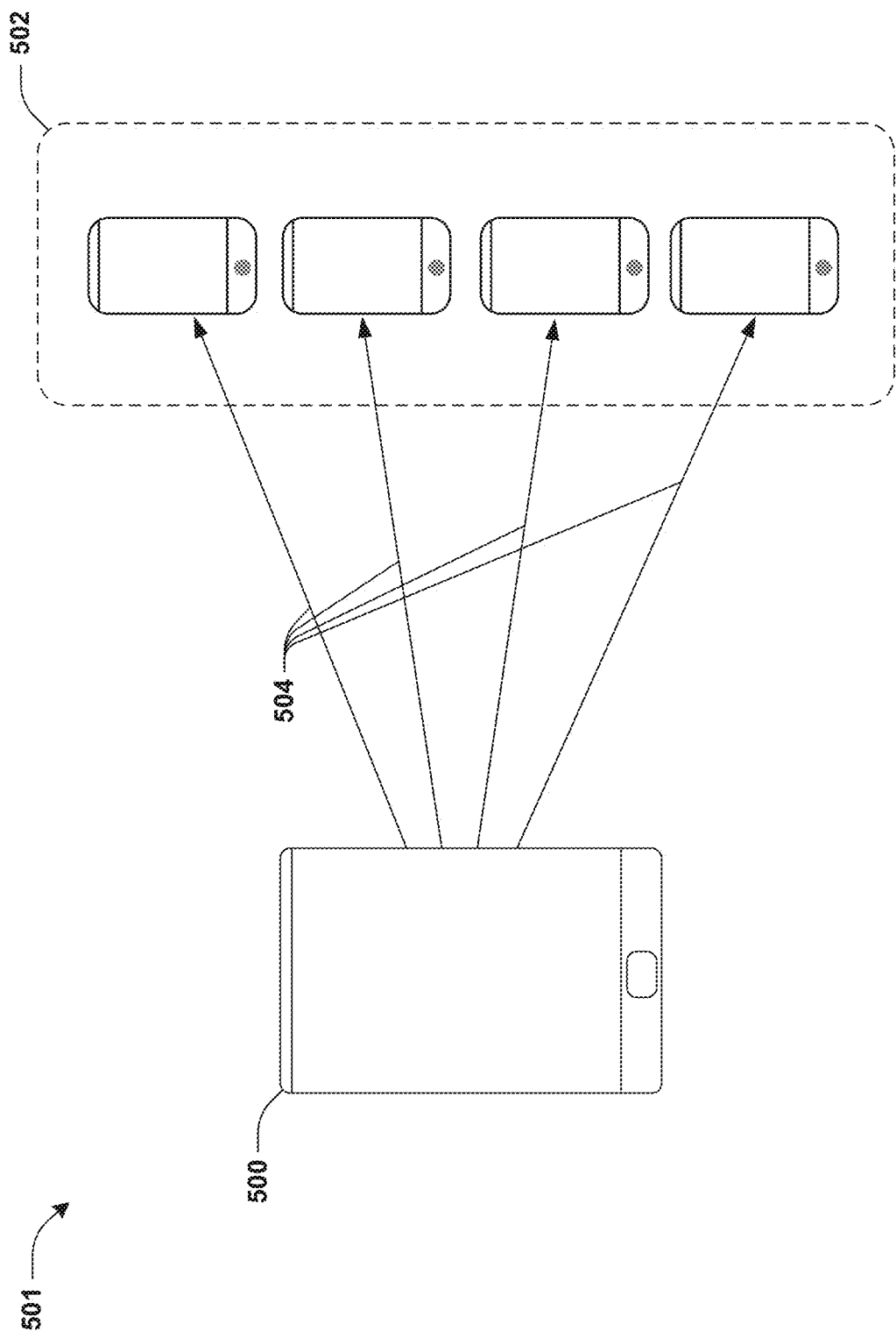
FIG. 5A is a component block diagram illustrating an example system for generating a network profile associated with devices and/or transmitting content to devices based upon the network profile, where a first client device performs transmissions of data to one or more first client devices.
Figure 5B:
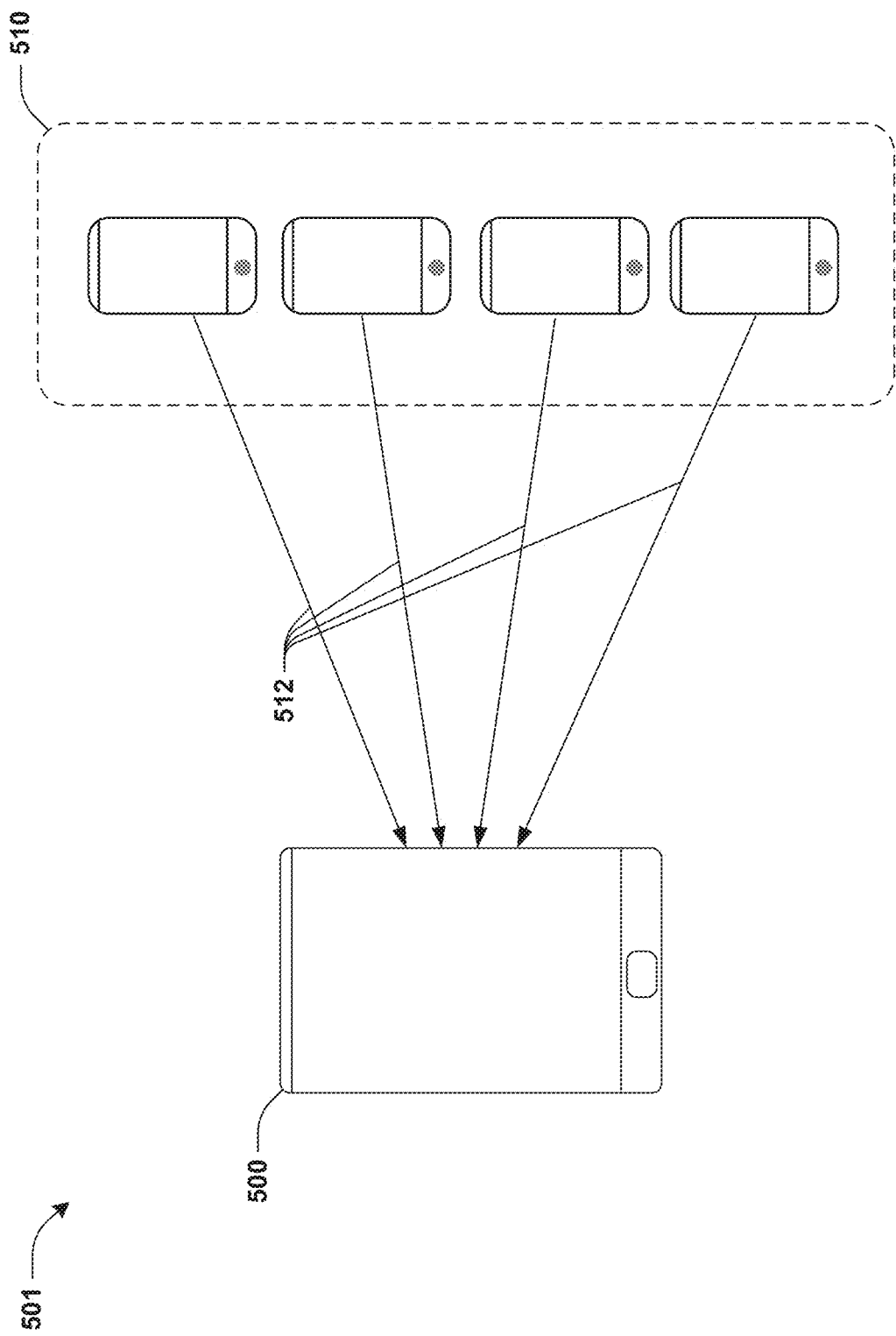
FIG. 5B is a component block diagram illustrating an example system for generating a network profile associated with devices and/or transmitting content to devices based upon the network profile, where data is received by a first client device from one or more second client devices.

FIG. 5A illustrates the first client device 500 performing transmissions of data 504 to one or more first client devices 502. The one or more first devices may comprise the one or more first client devices 502. Alternatively and/or additionally, the one or more first devices may comprise one or more host devices to which the first client device 500 transmits data associated with performance of one or more services associated with one or more components of one or more services. FIG. 5B illustrates receptions of data 512 by the first client device 500 from one or more second client devices 510. The one or more second devices may comprise the one or more second client devices 510. Alternatively and/or additionally, the one or more second devices may comprise one or more host devices from which the first client device 500 receives data associated with performance of one or more services associated with one or more components of one or more services.

At 404, a first network profile associated with the plurality of devices (and/or the plurality of nodes) may be generated based upon the first network traffic. In some examples, the first network profile may be indicative of transmission metrics associated with devices of the plurality of devices (and/or nodes of the plurality of nodes), such as a rate at which a device (and/or a node) performs transmissions to a different device (and/or a different node) and/or a quantity of transmissions of data by a device (and/or a node) to a different device (and/or a different node). Alternatively and/or additionally, the first network profile may be indicative of reception metrics associated with devices of the plurality of devices (and/or nodes of the plurality of nodes), such as a rate at which receptions of data by a device (and/or a node) from a different device (and/or a different node) occur and/or a quantity of receptions of data by a device (and/or a node) from a different device (and/or a different node). Alternatively and/or additionally, the first network profile may be indicative of reaction metrics associated with devices of the plurality of devices (and/or nodes of the plurality of nodes), such as a rate at which a device (and/or a node) reacts to receptions of data from a different device (and/or a different node) and/or a quantity of reactions by a device (and/or a node) to receptions of data from a different device (and/or a different node).

In some examples, the first network profile may be indicative of a transmitting device, a receiving device and/or a type of data for a communication of the first network traffic (e.g., a communication may correspond to a transmission of data and/or a reception of data). In an example where the first network traffic comprises a transmission of data by the first device to a different device, the first network profile may be indicative of the transmission of data, a type of data of the transmission of data, the first device being a transmitting device of the transmission of data and/or the different device being a receiving device of the transmission of data. Alternatively and/or additionally, the first network profile may be indicative of a transmitting device, a receiving device and/or a type of data for each communication of the first network traffic.

The first network profile may be indicative of one or more first sets of transmission metrics associated with the first device (and/or the first node). In some examples, a set of transmission metrics of the one or more first sets of transmission metrics may correspond to a measure of transmissions of data by the first device (and/or the first set of devices) to the one or more first devices. Alternatively and/or additionally, a set of transmission metrics of the one or more first sets of transmission metrics may correspond to a measure of transmissions of data by the first device (and/or the first set of devices) to multiple devices of the one or more first devices. In an example, the multiple devices may be associated with a single user account associated with a service (e.g., each device of the multiple devices may be logged into a single user account associated with a service, such as a communication service, a content service, etc.). Alternatively and/or additionally, a set of transmission metrics of the one or more first sets of transmission metrics may correspond to a measure of transmissions of data by the first device (and/or the first set of devices) to a single device of the one or more first devices.

The one or more first sets of transmission metrics associated with the first device may comprise a first set of transmission metrics (e.g., a set of one or more transmission metrics) associated with the first device (and/or the first node) and/or a second device of the one or more first devices. The first set of transmission metrics may correspond to a measure of transmissions of data to the second device. Alternatively and/or additionally, the first set of transmission metrics may be indicative of a first transmission rate at which the first device performs transmissions of data to the second device, such as during the first period of time. In an example, the first transmission rate may correspond to a quantity of transmissions of data by the first device to the second device per unit of time (e.g., per day, per week and/or per a different unit of time). In an example, the first transmission rate may correspond to five transmissions per day (e.g., on average, the first device may perform five transmissions of data to the second device per day). Alternatively and/or additionally, the first set of transmission metrics may be indicative of a first quantity of transmissions of data by the first device to the second device, such as during the first period of time. In an example, the first transmission rate may be determined based upon a duration of the first period of time and/or the first quantity of transmissions of data by the first device to the second device. Alternatively and/or additionally, the first set of transmission metrics may be indicative of types of data associated with transmissions of data by the first device to the second device (e.g., the types of data may correspond to text messages, phone calls, instant messages, social media posts, messages transmitted using a social media platform, emails, video calls, voice calls and/or a different type of data). Alternatively and/or additionally, the first set of transmission metrics may be indicative of initiators of data that is transmitted by the first device to the second device. In an example where the first device receives an exemplary message from an exemplary device and/or the first device transmits the exemplary message (and/or a second exemplary message comprising information of the exemplary message) to the second device, an initiator of the exemplary message (and/or the second exemplary message) may be determined to be the exemplary device. Alternatively and/or additionally, the first set of transmission metrics may be indicative of times (e.g., times of day and/or days of the week) associated with transmissions of data by the first device to the second device.

The first network profile may be indicative of one or more first sets of reception metrics associated with the first device (and/or the first node). In some examples, a set of reception metrics of the one or more first sets of reception metrics may correspond to a measure of receptions of data by the first device (and/or the first set of devices) from the one or more second devices. Alternatively and/or additionally, a set of reception metrics of the one or more first sets of reception metrics may correspond to a measure of receptions of data by the first device (and/or the first set of devices) from multiple devices of the one or more second devices. In an example, the multiple devices may be associated with a single user account associated with a service (e.g., each device of the multiple devices may be logged into a single user account associated with a service, such as a communication service, a content service, etc.). Alternatively and/or additionally, a set of reception metrics of the one or more first sets of reception metrics may correspond to a measure of receptions of data by the first device (and/or the first set of devices) from a single device of the one or more second devices.

The one or more first sets of reception metrics associated with the first device may comprise a first set of reception metrics (e.g., a set of one or more reception metrics) associated with the first device (and/or the first node) and/or a third device of the one or more second devices. The first set of reception metrics may correspond to a measure of receptions of data from the third device. Alternatively and/or additionally, the first set of reception metrics may be indicative of a first reception rate at which receptions of data by the first device from the third device occur, such as during the first period of time. In an example, the first reception rate may correspond to a quantity of receptions of data by the first device from the third device per unit of time (e.g., per day, per week and/or per a different unit of time). Alternatively and/or additionally, the first set of reception metrics may be indicative of a first quantity of receptions of data by the first device from the third device, such as during the first period of time. In an example, the first reception rate may be determined based upon a duration of the first period of time and/or the first quantity of receptions of data by the first device from the third device. Alternatively and/or additionally, the first set of reception metrics may be indicative of types of data associated with receptions of data by the first device from the third device. Alternatively and/or additionally, the first set of reception metrics may be indicative of initiators of data that is received by the first device from the third device. In an example where the third device receives an exemplary message from an exemplary device and/or the third device transmits the exemplary message (and/or a second exemplary message comprising information of the exemplary message) to the first device, an initiator of the exemplary message (and/or the second exemplary message) may be determined to be the exemplary device. Alternatively and/or additionally, the first set of reception metrics may be indicative of times (e.g., times of day and/or days of the week) associated with receptions of data by the first device from the third device.

In some examples, a transmission of data by the first device to the second device may correspond to a transmission of a message, an email, a social media post, an image, audio (such as an audio file, an audio message and/or audio being recorded for a telephone call and/or a voice call), a video (such as a video file, a video message and/or video being recorded for a video call) and/or a different type of data to the second device.

In an example, a transmission of data by the first device to the second device may correspond to a transmission of an email to the second device. The email may be addressed to one or more email addresses comprising an email address of a second user account associated with the second device. The email may be accessed by the second device (e.g., the email may be accessed using an email platform, such as an email application and/or an email web page on a browser).

In an example, a transmission of data by the first device to the second device may correspond to a transmission of an instant message to the second device. The instant message may be addressed to one or more devices comprising the second device and/or to one or more user accounts comprising the second user account associated with the second device. The instant message may be accessed by the second device (e.g., the instant message may be accessed using an instant messaging platform, such as an instant messaging application and/or an instant messaging web page on a browser).

In an example, a transmission of data by the first device to the second device may correspond to a transmission of a first social media post to the second device. The first social media post may comprise text, one or more images, audio content and/or video content. The first social media post may be uploaded to a server associated with a social media platform. The first social media post may be accessible by the public (e.g., the first social media post may be a public post available publicly, such as accessible to devices having a user account with the social media platform). Alternatively and/or additionally, the first social media post may be accessible by a selected group of devices and/or users (e.g., the first social media post may be a private post available to contacts and/or selected user accounts of the social media platform). The first social media post may be accessed by the second device (e.g., the first social media post may be accessed using a social media platform associated with the social media platform, such as a social media application and/or a social media web page on a browser). In an example, while the social media platform is opened and/or presented, one or more social media posts, comprising the first social media post, may be retrieved from a server associated with the social media platform and/or the one or more social media posts may be presented by the second device. The transmission of the first social media post to the second device may correspond to the first social media post being uploaded, by the first device, to a server associated with the social media platform and/or the first social media post being retrieved and/or presented by the second device.

In some examples, a reception of data by the first device from the third device may correspond to a reception of a message, an email, a social media post, an image, audio (such as an audio file, an audio message and/or audio being recorded for a telephone call and/or a voice call), a video (such as a video file, a video message and/or video being recorded for a video call) and/or a different type of data from the third device.

FIGS. 5C-5F illustrates an exemplary reception of data by the first client device 500 from a third client device 550. In an example, the third device of the one or more second devices may correspond to the third client device 550 (e.g., a smartphone, a tablet and/or a different type of client device).

Figure 5C:
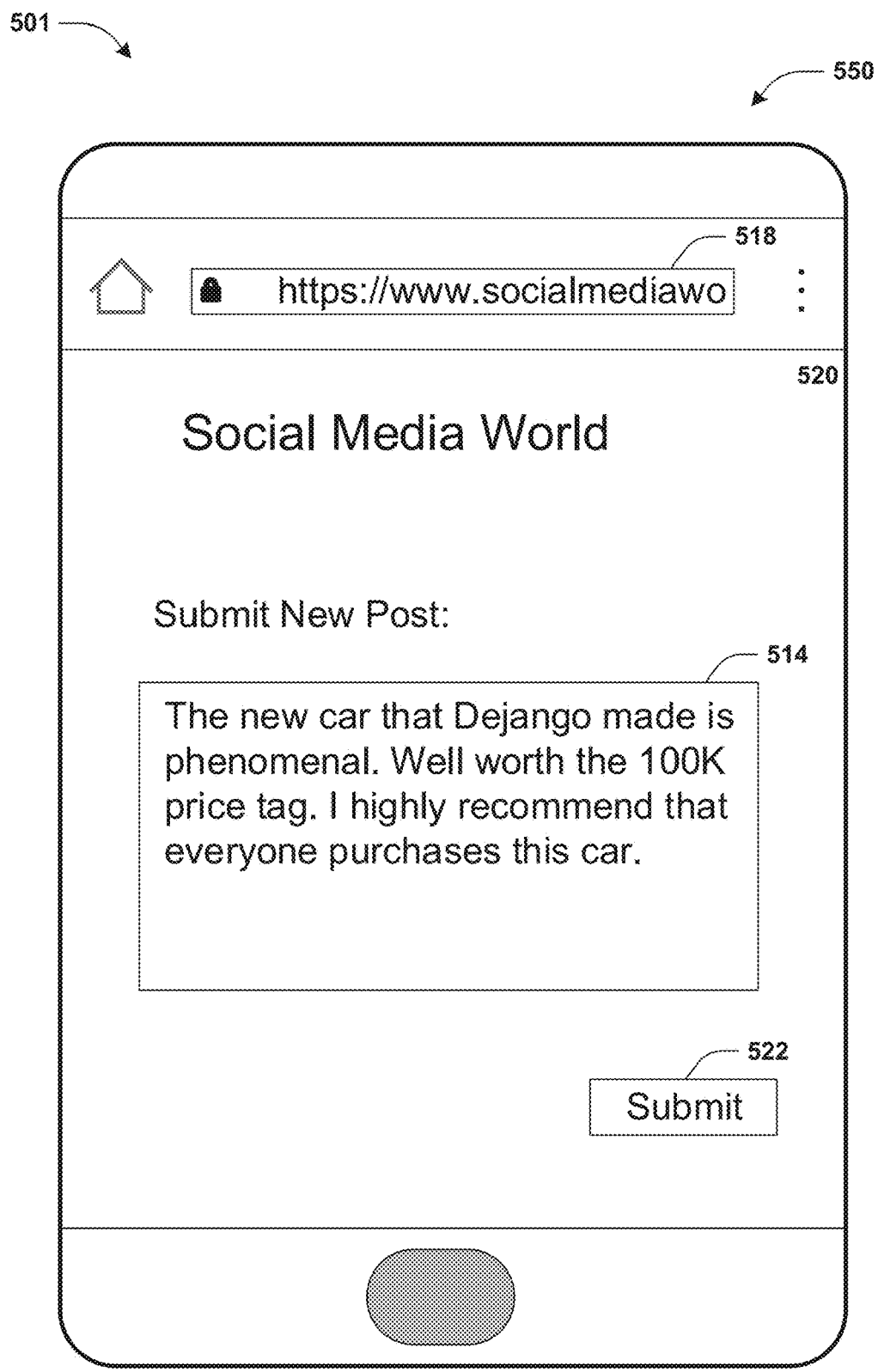
FIG. 5C is a component block diagram illustrating an example system for generating a network profile associated with devices and/or transmitting content to devices based upon the network profile, where a third client device presents and/or accesses a first web page using a browser of the third client device.

FIG. 5C illustrates the third client device 550 presenting and/or accessing a first web page 520 using a browser of the third client device 550. The browser may comprise an address bar 518 comprising a web address (e.g., a Uniform Resource Locator (URL)) of the first web page 520. In an example, the first web page 520 may be associated with a social media platform. The first web page 520 may comprise a social media interface associated with the social media platform. For example, the first web page 520 may comprise a social media post field 514. For example, text and/or one or more images may be entered into the social media post field 514. In some examples, the first web page 520 may comprise a submit selectable input 522 corresponding to submitting the text and/or the one or more images to generate a social media post.

Figure 5D:
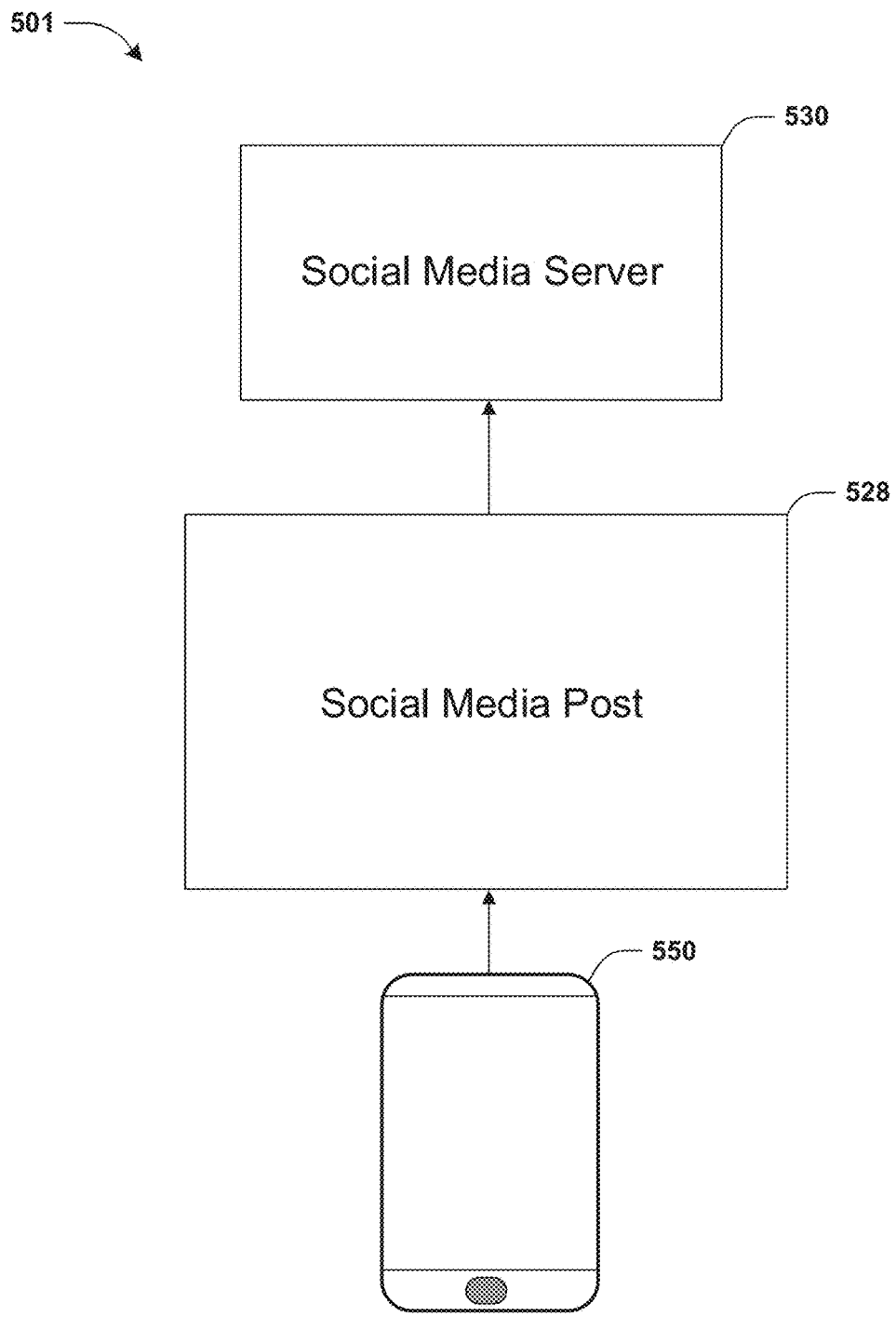
FIG. 5D is a component block diagram illustrating an example system for generating a network profile associated with devices and/or transmitting content to devices based upon the network profile, where social media post information is uploaded to a server associated with a social media platform.

FIG. 5D illustrates social media post information 528 being uploaded to a server 530 associated with the social media platform. For example, the third client device 550 may transmit the social media post information 528 to the server 530 responsive to a selection of the submit selectable input 522. The social media post information 528 may comprise the text and/or the one or more images.

Figure 5E:
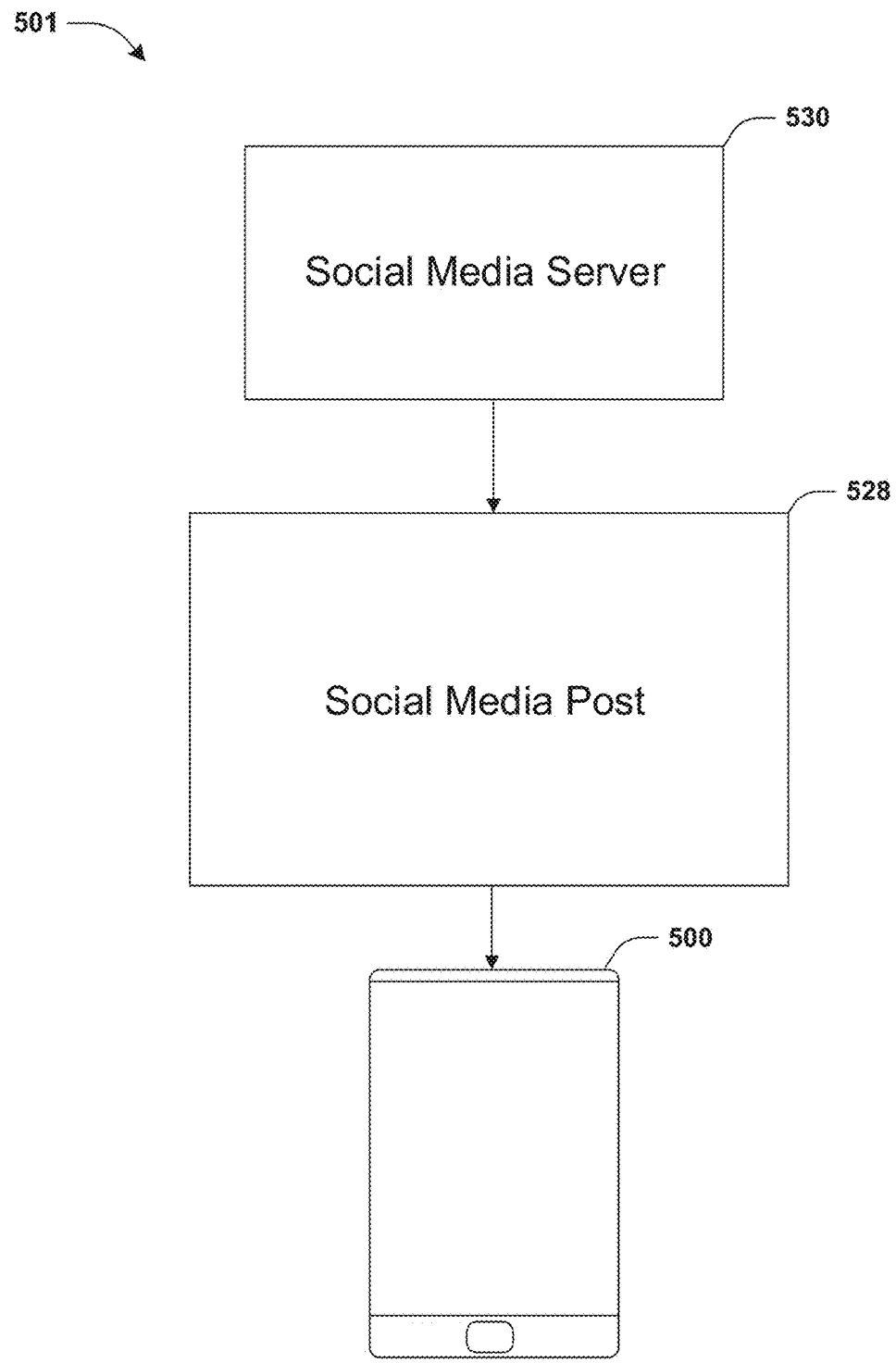
FIG. 5E is a component block diagram illustrating an example system for generating a network profile associated with devices and/or transmitting content to devices based upon the network profile, where social media post information is downloaded to a first client device.

FIG. 5E illustrates the social media post information 528 being downloaded to the first client device 500. For example, the server 530 may transmit the social media post information 528 to the first client device 500 responsive to the first client device 500 accessing a social media interface associated with the social media platform.

Figure 5F:
FIG. 5F is a component block diagram illustrating an example system for generating a network profile associated with devices and/or transmitting content to devices based upon the network profile, where a first client device presents and/or accesses a second web page using a browser of the first client device.

FIG. 5F illustrates the first client device 500 presenting and/or accessing a second web page 536 using a browser of the first client device 500. The second web page 536 may be the same as the first web page 520. The second web page 536 may comprise the social media interface associated with the social media platform. The social media interface may present a social media post 538 comprising the text and/or the one or more images of the social media post information 528. The social media interface may present the social media post 538 based upon a determination that the first client device 500 is authorized to access social media posts associated with the third client device 550 (e.g., a social media account associated with the first client device 500 may correspond to a contact and/or a friend of a social media account associated with the third client device 550). In some examples, the social media post 538 may comprise a comment selectable input 540 associated with commenting about the social media post 538 and/or a reaction selectable input 542 associated with expressing an opinion (e.g., a positive opinion) about the social media post 538.

The first network profile may be indicative of one or more first sets of reaction metrics associated with the first device (and/or the first node). In some examples, a set of reaction metrics of the one or more first sets of reaction metrics may correspond to a measure of reactions, by the first device, to receptions of data from the one or more second devices. Alternatively and/or additionally, a set of reaction metrics of the one or more first sets of reaction metrics may correspond to a measure of reactions, by the first device, to receptions of data from multiple devices of the one or more second devices. In an example, the multiple devices may be associated with a single user account associated with a service (e.g., each device of the multiple devices may be logged into a single user account associated with a service, such as a communication service, a content service, etc.). Alternatively and/or additionally, a set of reaction metrics of the one or more first sets of reaction metrics may correspond to a measure of reactions, by the first device, to receptions of data from a single device of the one or more second devices.

The one or more first sets of reaction metrics associated with the first device may comprise a first set of reaction metrics (e.g., a set of one or more reaction metrics) associated with the first device (and/or the first node) and/or the third device. The first set of reaction metrics may correspond to a measure of reactions, by the first device, to receptions of data from the third device. Alternatively and/or additionally, the first set of reaction metrics may be indicative of a first reaction rate at which the first device reacts to receptions of data from the third device, such as during the first period of time. In an example, the first reaction rate may be indicative of a quantity of reactions performed by the first device in response to receptions of data from the third device per unit of time (e.g., per day, per week and/or per a different unit of time). Alternatively and/or additionally, the first reaction rate may be indicative of an average quantity of reactions performed by the first device in response to each reception of data from the third device. Alternatively and/or additionally, the first set of reaction metrics may be indicative of a first quantity of reactions performed by the first device in response to receptions of data from the third device, such as during the first period of time. In an example, the first reaction rate, such as the quantity of reactions performed by the first device in response to receptions of data from the third device per unit of time, may be determined based upon a duration of the first period of time and/or the first quantity of reactions. Alternatively and/or additionally, the first reaction rate, such as the average quantity of reactions performed by the first device in response to each reception of data from the third device, may be determined based upon the first quantity of reactions and/or the first quantity of receptions. Alternatively and/or additionally, the first set of reaction metrics may be indicative of a first reaction speed with which the first device reacts to receptions of data from the third device, on average (e.g., an average duration of time between a reception of data from the third device and the first device performing a reaction to the reception of data). Alternatively and/or additionally, the first set of reaction metrics may be indicative of types of reactions associated with reactions performed by the first device in response to receptions of data from the third device (e.g., the types of reactions may correspond to transmission of an instant message responsive to receiving data from the third device, forwarding a message received from the third device, posting a social media post based upon a message received from the third device, performing a search using a query based upon a message received from the third device, performing a conversion event based upon a message received from the third device and/or a different type of reaction). Alternatively and/or additionally, the first set of reaction metrics may be indicative of times (e.g., times of day and/or days of the week) associated with reactions performed by the first device in response to receptions of data from the third device.

In some examples, a reaction performed by the first device in response to a reception of data from the third device may correspond to the first device responding to the reception of data. In an example, the reception of data may correspond to the first device receiving first data from the third device. The first data may comprise a message, an email, a social media post, an image, audio (such as an audio file, an audio message and/or audio being recorded for a telephone call and/or a voice call), a video (such as a video file, a video message and/or video being recorded for a video call) and/or a different type of data. The reaction performed by the first device may correspond to the first device transmitting second data to the third device in response to receiving the first data.

In an example, the reception of data may correspond to the first device receiving a first email from the third device. The reaction performed by the first device may correspond to the first device replying to the first email, such as by transmitting a reply email as a response to the first email to one or more devices comprising the third device. Alternatively and/or additionally, the reaction performed by the first device may correspond to the first device transmitting an email, a message and/or a social media post to one more devices comprising the third device, where a topic associated with the email, the message and/or the social media post is related to and/or matches a topic associated with the first email.

In an example, the reception of data may correspond to the first device receiving a first social media post from the third device. The reaction performed by the first device may correspond to the first device transmitting a second social media post to one or more devices comprising the third device as a response to the first social media post (e.g., the first device may submit the second social media post using the social media platform and/or the second social media post may be accessible to the one or more devices comprising the third device). Alternatively and/or additionally, the reaction performed by the first device may correspond to the first device commenting on the first social media post (e.g., the first device may post a comment in response to the first social media post). Alternatively and/or additionally, the reaction performed by the first device may correspond to the first device expressing a reaction (e.g., an opinion and/or an emotion) associated with the first social media post. For example, the first device may express a reaction to the first social media post, such as at least one of a like reaction, a laugh reaction, etc. by using a reaction selectable input. The social media platform may display the emotion selectable input adjacent to the first social media post.

With respect to FIG. 5F, in an example where the first device corresponds to the first client device 500 and/or the reception of data corresponds to the first client device 500 receiving the social media post 538 from the third client device 550, the reaction may comprise receiving a selection of the comment selectable input 540 and/or the reaction selectable input 542. For example, responsive to a selection of the comment selectable input 540, a comment field may be displayed. A comment may be entered into the comment field. Responsive to receiving the comment, the comment may be presented via other client devices that access the social media post 538, such as in a comments area adjacent to the social media post 538. Alternatively and/or additionally, responsive to a selection of the reaction selectable input 542, an indication of a positive reaction to the social media post 538 may be stored and/or presented via other client devices that access the social media post 538.

In an example, the reception of data may correspond to the first device receiving a first message (e.g., at least one of an instant message, a text message, etc.) from the third device. The reaction performed by the first device may correspond to the first device replying to the first message, such as by transmitting a reply message as a response to the first message to one or more devices comprising the third device. Alternatively and/or additionally, the reaction performed by the first device may correspond to the first device transmitting an email, a message and/or a social media post to one more devices comprising the third device, where a topic associated with the email, the message and/or the social media post is related to and/or matches a topic associated with the first message.

In some examples, a reaction performed by the first device in response to a reception of data from the third device may correspond to the first device performing one or more actions responsive to the reception of data. In an example, the reception of data may correspond to the first device receiving first data from the third device. The first data may comprise a message, an email, a social media post, an image, audio (such as an audio file, an audio message and/or audio being recorded for a telephone call and/or a voice call), a video (such as a video file, a video message and/or video being recorded for a video call) and/or a different type of data. The reaction performed by the first device may correspond to the first device performing one or more actions associated with the first data in response to receiving the first data. In some examples, the one or more actions may be determined to correspond to a reaction to the reception of the first data based upon a determination that the one or more actions are performed within a threshold duration of time (e.g., at least one of a day, a week, a month, etc.) after the reception of the first data.

In an example, the one or more actions may comprise the first device accessing and/or opening the first data (e.g., the first user consuming the first data). In an example where the first data comprises an email, the one or more actions may comprise the first device opening the first email. In an example where the first data comprises a video, the one or more actions may comprise the first device presenting the video.

In an example, the one or more actions may comprise performing a search associated with the first data. For example, the search may be identified and/or it may be determined that the search is associated with the first data by analyzing activity of the first device. For example, it may be determined that the search is associated with the first data and/or that performance of the search corresponds to a reaction to the reception of the first data based upon a determination that a query used to perform the search comprises one or more words matching one or more words of the first data and/or determining that a topic associated with the query is related to and/or matches a topic associated with the first data.

In an example, the one or more actions may comprise transmitting the first data (and/or a portion of the first data) to one or more other devices. For example, the transmission of the first data (and/or the portion of the first data) to the one or more other devices may be identified by analyzing activity of the first device.

In an example, the one or more actions may comprise transmitting second data, associated with the first data, to one or more devices (such as one or more devices that may or may not comprise the third device). For example, the transmission of the second data may be identified and/or it may be determined that the second data is associated with the first data by analyzing activity of the first device. For example, it may be determined that the second data is associated with the first data and/or that transmission of the second data to the one or more devices corresponds to a reaction to the reception of the first data based upon a determination that the second data comprises one or more words matching one or more words of the first data and/or determining that a topic associated with the second data is related to and/or matches a topic associated with the first data.

In an example, the one or more actions may comprise accessing an internet resource associated with the first data. For example, the internet resource may be identified and/or it may be determined that the internet resource is associated with the first data by analyzing activity of the first device. For example, it may be determined that the internet resource is associated with the first data and/or that accessing the internet resource corresponds to a reaction to the reception of the first data based upon a determination that the internet resource comprises one or more words matching one or more words of the first data and/or determining that a topic associated with the first internet resource is related to and/or matches a topic associated with the first data.

In an example, the one or more actions may comprise performing a first conversion event associated with the first data. In some examples, the first conversion event may be detected by analyzing activity associated with the first device. The first conversion event may correspond to at least one of a purchase of a product associated with the first data (e.g., a topic of the first data may be related to and/or match the product), a purchase of a service associated with the first data (e.g., a topic of the first data may be related to and/or match the service), subscribing to (and/or signing up for) a service associated with the first data, contacting an entity (e.g., a company, an organization, a brand, etc.) that is associated with the first data (e.g., the first data may be indicative of the entity), adding a product and/or a service associated with the first data to a shopping cart on an online shopping platform, completing a form (e.g., a survey form), creating and/or registering an account (e.g., a user account) for a platform associated with the entity (e.g., creating a shopping user account for an online shopping platform), downloading an application (e.g., a mobile application) associated with the entity onto the first device and/or installing the application on the first device, opening and/or interacting with the application, utilizing one or more services associated with the entity using the application, etc. For example, it may be determined that the first conversion event is associated with the first data and/or that performing the first conversion event corresponds to a reaction to the reception of the first data based upon a determination that an entity and/or a product associated with the first conversion event is related to and/or matches a topic associated with the first data.

In some examples, a first influence score associated with the first device and/or the third device may be determined based upon the first network profile. The first influence score may be indicative of an amount of influence that data transmitted from the third device to the first device has on the first user of the first device. For example, the first influence score may be indicative of a probability that the first device and/or the first user will react in response to a reception of data from the third device. Alternatively and/or additionally, the first influence score may be indicative of a probability that the first device and/or the first user will perform one or more specific reactions in response to receiving data from the third device. In an example, the one or more specific reactions may comprise at least one of performing a conversion event associated with the received data, responding to the third device, performing research on a topic of the received data, accessing one or more internet resources associated with the topic and/or the received data, transmitting the received data to one or more other devices, etc.

The first influence score may be determined based upon the first set of reception metrics and/or the first set of reaction metrics. In an example, a higher value of the first reaction rate and/or a higher value of the first quantity of reactions may result in a higher value of the first influence score. Alternatively and/or additionally, a higher value of the first reception rate and/or a higher value of the first quantity of receptions of data may result in a higher value of the first influence score. Alternatively and/or additionally, the first influence score may be determined based upon the first reaction speed. For example, a lower duration of time between a reception of data from the third device and a reaction performed by the first device, on average, may result in a higher value of the first influence score.

Alternatively and/or additionally, reactions of the first device performed in response to receptions of data from the third device may be analyzed to determine a value of the reactions. The value of the reactions may be determined based upon an amount of revenue received as a result of the reactions being performed (e.g., in an example where a reaction corresponds to a purchase of a product, the amount of revenue may be associated with an amount spent on the product). In some examples, the first influence score may be determined based upon the value of the reactions.

Alternatively and/or additionally, a plurality of sets of influence scores, comprising the first influence score, may be determined based upon the first network profile. For example, an influence score of the plurality of sets of influence scores may be indicative of an amount of influence that data transmitted from a device of the plurality of devices to a different device of the plurality of devices has on a user of the different device. A set of influence scores of the plurality of sets of influence scores may be associated with a device of the plurality of devices. In an example, a first set of influence scores of the plurality of sets of influence scores may be associated with the first device. The first set of influence scores may comprise the first influence score associated with the third device and/or other influence scores associated with other devices that the first device communicated with during the first period of time. In some examples, the plurality of sets of influence scores may be determined using one or more of the techniques presented herein, such as based upon sets of transmission metrics of the first network profile, sets of reception metrics of the first network profile and/or sets of reaction metrics of the first network profile.

In some examples, the first activity and/or the first network traffic may be categorized and/or modeled based upon categories, such as topic, type of data, etc. to determine network profiles associated with the categories (and/or to determine transmission metrics, reception metrics, reaction metrics, etc. associated with devices and/or nodes in association with a category).

In some examples, topic-related influence scores may be determined. For example, a topic-related influence score may be indicative of an amount of influence that data transmitted from a device of the plurality of devices to a different device of the plurality of devices has on a user of the different device in association with a topic. In some examples, a topic-related influence score may be determined based upon network traffic associated with a topic and/or a network profile associated with the topic.

In some examples, the first activity of the plurality of devices may be analyzed based upon a plurality of topics to identify a plurality of sets of network traffic associated with the plurality of topics. For example, a set of network traffic of the plurality of sets of network traffic may be associated with a topic of the plurality of topics. Alternatively and/or additionally, rather than analyzing the first activity to identify the plurality of sets of network traffic, the first network traffic may be analyzed based upon the plurality of topics to identify the plurality of sets of network traffic. The plurality of topics may comprise topics associated with one or more products and/or one or more services (e.g., at least one of electronics, home appliances, boats, phones, smartphones, tax form preparation, dry-cleaning, printing services, etc.), an entity (e.g., a company, an organization, a brand, etc.) and/or the plurality of topics may comprise one or more other topics such as politics, cuisine, a region (e.g., a country, a state, a city, etc.), etc.

In an example, a first set of network traffic of the plurality of sets of network traffic may be associated with a first topic of the plurality of topics. The first topic may correspond to cars. The first set of network traffic may comprise communications between devices of the plurality of devices associated with cars. For example, the communications may comprise transmissions and/or receptions of data associated with cars, such as images, videos and/or text related to cars, advertisements that advertise cars, suggestions to purchase a car, etc.

In some examples, a plurality of topic-related network profiles may be generated based upon the plurality of sets of network traffic. The plurality of topic-related network profiles may be associated with the plurality of topics. For example, a topic-related network profile of the plurality of topic-related network profiles may be indicative of transmission metrics associated with communications, related to a topic of the plurality of topics, of devices of the plurality of devices. Alternatively and/or additionally, the topic-related network profile may be indicative of reception metrics associated with communications, related to the topic, of devices of the plurality of devices. Alternatively and/or additionally, the topic-related network profile may be indicative of reaction metrics associated with communications, related to the topic, of devices of the plurality of devices.

In an example, a first topic-related network profile of the plurality of topic-related network profiles may be associated with the first topic (e.g., cars). The first topic-related network profile may be generated based upon the first set of network traffic. The first topic-related network profile may be indicative of transmission metrics associated with communications, related to cars, of devices of the plurality of devices. Alternatively and/or additionally, the first topic-related network profile may be indicative of reception metrics associated with communications, related to cars, of devices of the plurality of devices. Alternatively and/or additionally, the first topic-related network profile may be indicative of reaction metrics associated with communications, related to cars, of devices of the plurality of devices.

In some examples, a plurality of sets of topic-related influence scores may be determined based upon a topic-related network profile of the plurality of topic-related network profiles (and/or based upon each topic-related network profile of the plurality of topic-related network profiles). For example, a first plurality of sets of topic-related influence scores may be determined based upon the first topic-related network profile associated with the first topic, a second plurality of sets of topic-related influence scores may be determined based upon a second topic-related network profile associated with a second topic of the plurality of topics, a third plurality of sets of topic-related influence scores may be determined based upon a third topic-related network profile associated with a third topic of the plurality of topics, etc.

In an example, a set of topic-related influence scores of the first plurality of sets of topic-related influence scores may be associated with a device of the plurality of devices. In an example, a first set of topic-related influence scores of the first plurality of sets of topic-related influence scores may be associated with the first device. The first set of topic-related influence scores may comprise a first topic-related influence score associated with the third device and/or other topic-related influence scores associated with other devices. In some examples, the first topic-related influence score associated with the third device may be indicative of an amount of influence that data, associated with the first topic, transmitted from the third device to the first device has on the first user of the first device. For example, the first topic-related influence score may be indicative of a probability that the first device and/or the first user will react in response to a reception of data associated with the first topic from the third device. Alternatively and/or additionally, the first topic-related influence score may be indicative of a probability that the first device and/or the first user will perform one or more specific reactions in response to receiving data associated with the first topic from the third device.

In some examples, the first activity of the plurality of devices may be analyzed based upon a plurality of types of data to identify a second plurality of sets of network traffic associated with the plurality of types of data. For example, a set of network traffic of the second plurality of sets of network traffic may be associated with a type of data of the plurality of types of data. Alternatively and/or additionally, rather than analyzing the first activity to identify the second plurality of sets of network traffic, the first network traffic may be analyzed based upon the plurality of types of data to identify the second plurality of sets of network traffic. The plurality of types of data may comprise a type of data corresponding to text messages, a type of data corresponding to phone calls, a type of data corresponding to instant messages, a type of data corresponding to social media messages (e.g., social media posts and/or messages transmitted using a social media platform), a type of data corresponding to emails, a type of data corresponding to video calls, a type of data corresponding to voice calls and/or a different type of data.

In an example, a second set of network traffic of the second plurality of sets of network traffic may be associated with a first type of data of the plurality of types of data. The first type of data may correspond to instant messages. The second set of network traffic may comprise instant messaging communications between devices of the plurality of devices. For example, the instant messaging communications may comprise transmissions and/or receptions of instant messages.

In some examples, a plurality of data type-related network profiles may be generated based upon the second plurality of sets of network traffic. The plurality of data type-related network profiles may be associated with the plurality of types of data. For example, a data type-related network profile of the plurality of data type-related network profiles may be indicative of transmission metrics associated with communications, corresponding to a type of data of the plurality of types of data, of devices of the plurality of devices. Alternatively and/or additionally, the data type-related network profile may be indicative of reception metrics associated with communications, corresponding to the type of data, of devices of the plurality of devices. Alternatively and/or additionally, the data type-related network profile may be indicative of reaction metrics associated with communications, corresponding to the type of data, of devices of the plurality of devices.

In an example, a first data type-related network profile of the plurality of data type-related network profiles may be associated with the first type of data (e.g., instant messages). The first data type-related network profile may be generated based upon the second set of network traffic. The first data type-related network profile may be indicative of transmission metrics associated with instant messaging communications of devices of the plurality of devices. Alternatively and/or additionally, the first data type-related network profile may be indicative of reception metrics associated with instant messaging communications of devices of the plurality of devices. Alternatively and/or additionally, the first data type-related network profile may be indicative of reaction metrics associated with instant messaging communications of devices of the plurality of devices.

In some examples, a plurality of sets of data type-related influence scores may be determined based upon a data type-related network profile of the plurality of data type-related network profiles (and/or based upon each data type-related network profile of the plurality of data type-related network profiles). For example, a first plurality of sets of data type-related influence scores may be determined based upon the first data type-related network profile associated with the first type of data, a second plurality of sets of data type-related influence scores may be determined based upon a second data type-related network profile associated with a second type of data of the plurality of types of data, a third plurality of sets of data type-related influence scores may be determined based upon a third data type-related network profile associated with a third type of data of the plurality of types of data, etc.

In an example, a set of data type-related influence scores of the first plurality of sets of data type-related influence scores may be associated with a device of the plurality of devices. In an example, a first set of data type-related influence scores of the first plurality of sets of data type-related influence scores may be associated with the first device. The first set of data type-related influence scores may comprise a first data type-related influence score associated with the third device and/or other data type-related influence scores associated with other devices. In some examples, the first data type-related influence score associated with the third device may be indicative of an amount of influence that data, associated with the first type of data, transmitted from the third device to the first device has on the first user of the first device. For example, the first data type-related influence score may be indicative of a probability that the first device and/or the first user will react in response to a reception of data associated with the first type of data from the third device. Alternatively and/or additionally, the first data type-related influence score may be indicative of a probability that the first device and/or the first user will perform one or more specific reactions in response to receiving data associated with the first type of data from the third device.

In some examples, combination influence scores may be determined. For example, a combination influence score may be indicative of an amount of influence that data, corresponding to a type of data of the plurality of types of data, transmitted from a device of the plurality of devices to a different device of the plurality of devices has on a user of the different device in association with a topic of the plurality of topics, where the data is associated with the topic. In some examples, a combination influence score may be determined based upon network traffic associated with a type of data of the plurality of types of data and/or a topic of the plurality of topics. For example, the first activity of the plurality of devices and/or the first network traffic may be analyzed based upon the plurality of topics and/or the plurality of types of data to identify a third plurality of sets of network traffic. A set of network traffic of the third plurality of sets of network traffic may be associated with a topic of the plurality of topics and/or a type of data of the plurality of types of data.

In an example, a third set of network traffic of the third plurality of sets of network traffic may be associated with the first topic (e.g., cars) and/or the first type of data (e.g., instant messages). The third set of network traffic may comprise instant messaging communications associated with cars between devices of the plurality of devices. For example, the communications may comprise transmissions and/or receptions of instant messages associated with cars.

In some examples, a plurality of combination network profiles may be generated based upon the third plurality of sets of network traffic. The plurality of combination network profiles may be associated with the plurality of topics and/or the plurality of types of data. For example, a combination network profile of the plurality of combination network profiles may be indicative of transmission metrics associated with communications of devices of the plurality of devices, where the communications correspond to a type of data of the plurality of types of data and/or the communications are related to a topic of the plurality of topics. Alternatively and/or additionally, the combination network profile may be indicative of reception metrics associated with communications of devices of the plurality of devices, where the communications correspond to the type of data and/or the communications are related to the topic. Alternatively and/or additionally, the combination network profile may be indicative of reaction metrics associated with communications of devices of the plurality of devices, where the communications correspond to the type of data and/or the communications are related to the topic.

In an example, a first combination network profile of the plurality of combination network profiles may be associated with the first topic (e.g., cars) and/or the first type of data (e.g., instant messages). The first combination network profile may be generated based upon the third set of network traffic. The first combination network profile may be indicative of transmission metrics associated with instant messaging communications, related to cars, of devices of the plurality of devices. The first combination network profile may be indicative of reception metrics associated with instant messaging communications, related to cars, of devices of the plurality of devices. The first combination network profile may be indicative of reaction metrics associated with instant messaging communications, related to cars, of devices of the plurality of devices.

In some examples, a plurality of sets of combination influence scores may be determined based upon a combination network profile of the plurality of combination network profiles (and/or based upon each combination network profile of the plurality of combination network profiles). For example, a first plurality of sets of combination influence scores may be determined based upon the first combination network profile associated with the first type of data and/or the first topic, a second plurality of sets of combination influence scores may be determined based upon a second combination network profile associated with the first type of data and/or a second topic of the plurality of topics, a third plurality of sets of combination influence scores may be determined based upon a third combination network profile associated with the first topic and/or a second type of data of the plurality of types of data, etc.

In an example, a set of combination influence scores of the first plurality of sets of combination influence scores may be associated with a device of the plurality of devices. In an example, a first set of combination influence scores of the first plurality of sets of combination influence scores may be associated with the first device. The first set of combination influence scores may comprise a first combination influence score associated with the third device and/or other combination influence scores associated with other devices. In some examples, the first combination influence score associated with the third device may be indicative of an amount of influence that data, associated with the first type of data and/or the first topic, transmitted from the third device to the first device has on the first user of the first device. For example, the first combination influence score may be indicative of a probability that the first device and/or the first user will react in response to a reception of data associated with the first type of data and/or the first topic from the third device. Alternatively and/or additionally, the first combination influence score may be indicative of a probability that the first device and/or the first user will perform one or more specific reactions in response to receiving data associated with the first type of data and/or the first topic from the third device.

In some examples, influence information may be stored in an influence score data structure. The influence information may comprise influence scores determined based upon the first network profile. Alternatively and/or additionally, the influence information may comprise topic-related influence scores determined based upon the plurality of topic-related network profiles. Alternatively and/or additionally, the influence information may comprise data type-related influence scores determined based upon the plurality of data type-related network profiles. Alternatively and/or additionally, the influence information may comprise combination influence scores determined based upon the plurality of combination network profiles.

The influence information of the influence score data structure may be arranged and/or organized by at least one of device, topic, type of data, etc. Alternatively and/or additionally, device identifiers associated with the plurality of devices, topic identifiers associated with the plurality of topics and/or data type identifiers associated with the plurality of types of data (and/or combination identifiers associated with combinations of types of data and topics) may be used for labeling (and/or tagging) the influence scores, the topic-related influence scores, the data type-related influence scores and/or the combination influence scores. Accordingly, influence scores, topic-related influence scores, data type-related influence scores and/or combination influence scores associated with one or more devices may be identified (e.g., quickly identified) by analyzing the influence score data structure based upon one or more device identifiers, one or more topic identifiers, one or more device type identifiers and/or one or more combination identifiers.

Figure 5G:
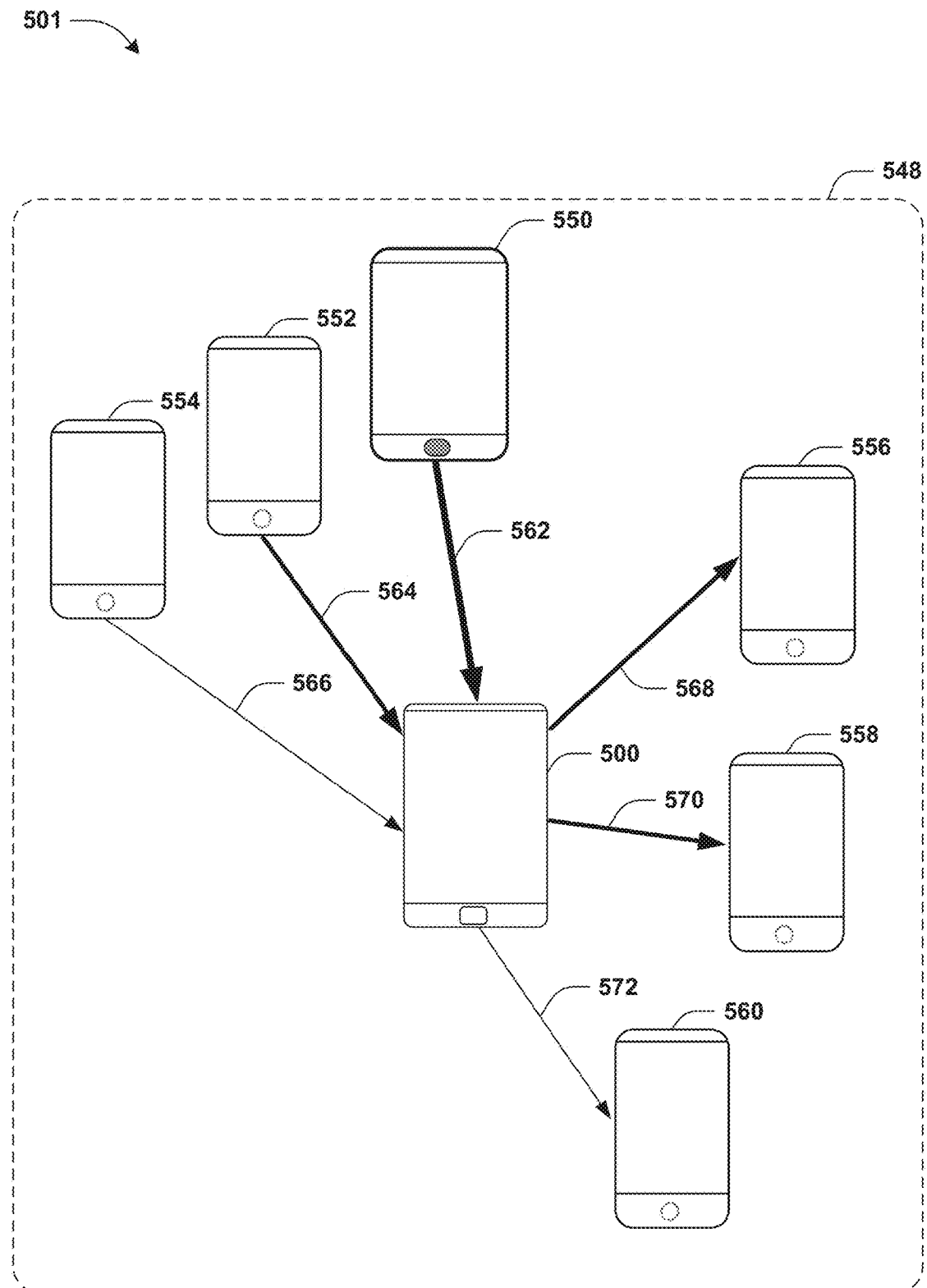
FIG. 5G is a component block diagram illustrating an example system for generating a network profile associated with devices and/or transmitting content to devices based upon the network profile, where an influence map is generated based upon an influence data structure.

FIG. 5G illustrates a representation of an influence map 548 associated with the first client device 500. In some examples, the influence map 548 may be generated based upon the influence data structure. In an example, influence lines 562, 564, 566, 568, 570 and/or 572 may be representative of influence scores associated with the first client device 500, the third client device 550, and/or client devices 552, 554, 556, 558 and/or 560. Alternatively and/or additionally, arrows of the influence lines 562, 564, 566, 568, 570 and/or 572 may be representative of a directionality of the influence scores. Alternatively and/or additionally, thicknesses of the influence lines 562, 564, 566, 568, 570 and/or 572 may be representative of values of the influence scores, such as an amount of influence that a data transmission by a device has on a user of a different device.

In an example, the influence line 562 having an arrow pointing from the third client device 550 towards the first client device 500 may indicate that the influence line 562 is representative of an amount of influence that data transmitted from the third client device 550 to the first client device 500 has on the first user of the first client device 500. Alternatively and/or additionally, the influence line 562 having a greater thickness than influence lines 564, 566, 568, 570 and/or 572 may indicate that the influence line 562 is representative of an amount of influence that is greater than other amounts of influence associated with the influence lines 564, 566, 568, 570 and/or 572.

In some examples, the influence map 548 may be generated based upon influence scores, topic-related influence scores, data type-related influence scores and/or combination influence scores associated with the first client device 500. In an example, the influence line 562 may be representative of a topic-related influence score associated with a topic of the social media post 538 (e.g., cars). Alternatively and/or additionally, the influence line 562 may be representative of a data type-related influence score associated with a type of data of the social media post 538 (e.g., the type of data corresponds to social media messages and/or social media posts). Alternatively and/or additionally, the influence line 562 may be representative of a combination influence score associated with the topic of the social media post 538 and/or the type of data of the social media post 538. In some examples, the influence map 548 may be stored in the influence data structure.

In some examples, transmission of content to devices of the plurality of devices may be controlled based upon the first network profile, the plurality of topic-related network profiles, the plurality of data type-related network profiles and/or the plurality of combination network profiles. Alternatively and/or additionally, transmission of content to devices of the plurality of devices may be controlled based upon the influence data structure (e.g., transmission of content to devices of the plurality of devices may be controlled based upon influence scores, topic-related influence scores, data type-related influence scores, combination influence scores and/or influence maps).

For example, a content system for transmitting content to devices may be provided. The content system may transmit content based upon information determined by the network system, such as the first network profile, the plurality of topic-related network profiles, the plurality of data type-related network profiles, the plurality of combination network profiles and/or the influence data structure. In some examples, the content system may be an advertisement system (e.g., an online advertising system). Alternatively and/or additionally, the content system may not be an advertisement system. The content system may provide content items to be presented via pages associated with the content system. For example, the pages may be associated with websites (e.g., websites providing search engines, email services, news content, communication services, etc.) associated with the content system. The content system may provide content items to be presented in (dedicated) locations throughout the pages (e.g., one or more areas of the pages configured for presentation of content items). For example, a content item may be presented at the top of a web page associated with the content system (e.g., within a banner area), at the side of the web page (e.g., within a column), in a pop-up window, overlaying content of the web page, etc. Alternatively and/or additionally, a content item may be presented within an application associated with the content system and/or within a game associated with the content system. Alternatively and/or additionally, a user may be required to watch and/or interact with the content item before the user can access content of a web page, utilize resources of an application and/or play a game.

In some examples, the first network profile, the plurality of topic-related network profiles, the plurality of data type-related network profiles, the plurality of combination network profiles and/or the influence data structure may be analyzed to select one or more content items, from a content item database, for transmission to one or more devices and/or to select one or more platforms to present the one or more content items via the one or more devices.

For example, one or more first content items may be selected for transmission to the third device. The one or more first content items may be selected based upon the first network profile, the plurality of topic-related network profiles, the plurality of data type-related network profiles, the plurality of combination network profiles and/or the influence data structure.

In an example, the influence data structure may be analyzed to determine influence score information associated with the third device. The influence score information may comprise one or more influence scores comprising the first influence score (associated with the first device and/or the third device) and/or one or more other influence scores associated with one or more other devices (e.g., an influence score of the one or more other influence scores may be indicative of an amount of influence that a transmission of data by the third device, to a device of the one or more other devices, has on a user of the device). Alternatively and/or additionally, the influence score information may comprise one or more topic-related influence scores comprising the first topic-related influence score (associated with the first device and/or the third device) and/or one or more other topic-related influence scores associated with one or more other devices (e.g., a topic-related influence score of the one or more other topic-related influence scores may be indicative of an amount of influence that a transmission of data by the third device, to a device of the one or more other devices, has on a user of the device, where the transmission of data is associated with the first topic). Alternatively and/or additionally, the influence score information may comprise one or more data type-related influence scores comprising the first data type-related influence score (associated with the first device and/or the third device) and/or one or more other data type-related influence scores associated with one or more other devices (e.g., a data type-related influence score of the one or more other data type-related influence scores may be indicative of an amount of influence that a transmission of data by the third device, to a device of the one or more other devices, has on a user of the device, where the transmission of data is associated with the first type of data). Alternatively and/or additionally, the influence score information may comprise one or more combination influence scores comprising the first combination influence score (associated with the first device and/or the third device) and/or one or more other combination influence scores associated with one or more other devices.

In some examples, a first content item of the one or more first content items may be selected for transmission to the third device based upon the influence score information associated with the third device and/or based upon a first transmission probability. The first transmission probability may correspond to a probability that the third device will transmit related information, associated with the first content item, to one or more devices (such as the first device) in response to receiving the first content item. For example, the first transmission probability may be determined based upon one or more transmission metrics and/or one or more reaction metrics associated with the third device. The one or more transmission metrics and/or the one or more reaction metrics associated with the third device may be determined by analyzing the first network profile, the plurality of topic-related network profiles, the plurality of data type-related network profiles, the plurality of combination network profiles based upon a device identifier associated with the third device. In an example, the one or more transmission metrics and/or the one or more reaction metrics may be associated with a topic associated with the first content item (e.g., the one or more transmission metrics may be identified within the plurality of topic-related network profiles and/or the plurality of combination network profiles). The one or more transmission metrics and/or the one or more reaction metrics may be indicative of a behavior of the third device in response to reception of content items by the third device. For example, the one or more transmission metrics and/or the one or more reaction metrics may be indicative of a rate at which the third device transmits information, related to content items provided by the content system, to other devices responsive to receiving content items from the content system. Alternatively and/or additionally, the one or more transmission metrics and/or the one or more reaction metrics may be indicative of a rate at which the third device transmits information, related to content items provided by the content system, to other devices responsive to receiving content items, associated with a topic of the first content item, from the content system. Accordingly, the first transmission probability may be determined based upon the one or more transmission metrics and/or the one or more reaction metrics.

A first conversion probability associated with the first content item may be determined based upon the first transmission probability and/or the influence score information. For example, the first conversion probability may correspond to a probability that one or more devices (such as the first device, the third device and/or one or more other devices) will perform one or more conversion events, associated with the first content item, in response to transmission of the first content item to the third device. For example, the first conversion probability may correspond to a probability that, in response to transmitting the first content item to the third device, the third device transmits related information associated with the first content item to one or more devices (such as the first device and/or other devices) and/or that the one or more devices (and/or a subset of the one or more devices) will perform one or more reactions (e.g., one or more actions corresponding to a conversion event) in response to receiving the related information from the third device.

In some examples, the first transmission probability and/or the first conversion probability may be determined based upon a platform with which the first content item is configured to be presented. For example, the platform may be associated with a type of data of the plurality of types of data. In an example, the first type of data corresponding to instant messages is associated with an instant messaging platform, a type of data corresponding to social media messages (and/or social media posts) is associated with a social media platform and/or a type of data corresponding to emails is associated with an email platform. For example, based upon a determination that the first content item is configured to be presented via a platform (e.g., an instant messaging platform) associated with the first type of data (e.g., instant messages), the first transmission probability may be determined based upon one or more transmission metrics and/or one or more reaction metrics associated with the first type of data (e.g., the one or more transmission metrics and/or the one or more reaction metrics may be determined by analyzing the plurality of data type-related network profiles and/or the plurality of combination network profiles based upon the third device and/or the first type of data). Alternatively and/or additionally, based upon a determination that the first content item is configured to be presented via the platform associated with the first type of data, the first conversion probability may be determined based upon one or more device-type related influence scores and/or one or more combination influence scores associated with the first type of data (e.g., the one or more device-type related influence scores and/or the one or more combination influence scores may be determined by analyzing the influence data structure based upon the first type of data and/or the third device).

In an example, a first request for content associated with the third device may be received. The first request for content may be received responsive to the third device accessing a first internet resource associated with the content system (e.g., one or more of a web page of a website associated with the content system, an application associated with the content system, an internet game associated with the content system, etc.). For example, the third device may transmit a request to access the first internet resource to a first server associated with the first internet resource. Responsive to receiving the request to access the first internet resource, the first server associated with the first internet resource may transmit the first request for content to the content system (and/or to a second server associated with the content system). Alternatively and/or additionally, the first request for content may be received from the third device. In some examples, the first request for content may correspond to a request to be provided with a content item (e.g., an advertisement, an image, a link, a video, etc.) for presentation via the first internet resource.

In some examples, responsive to receiving the first request for content, the first content item may be selected from a plurality of content items of the content item database. The first content item may be selected based upon the first transmission probability and/or the first conversion probability (e.g., the first transmission probability and/or the first conversion probability may be determined based upon a platform associated with the first internet resource). Alternatively and/or additionally, a plurality of transmission probabilities (comprising the first transmission probability associated with the first content item) and/or a plurality of conversion probabilities (comprising the first conversion probability associated with the first content item) associated with the plurality of content items may be determined using one or more of the techniques presented herein. The first content item may be selected from the plurality of content items based upon the plurality of transmission probabilities and/or the plurality of conversion probabilities. For example, the first content item may be selected from the plurality of content items based upon a determination that the first transmission probability associated with the first content item is higher than other transmission probabilities of the plurality of transmission probabilities (and/or that the first transmission probability is the highest transmission probability of the plurality of transmission probabilities). Alternatively and/or additionally, the first content item may be selected from the plurality of content items based upon a determination that the first conversion probability associated with the first content item is higher than other conversion probabilities of the plurality of conversion probabilities (and/or that the first conversion probability is the highest conversion probability of the plurality of conversion probabilities).

Alternatively and/or additionally, a plurality of content item scores associated with the plurality of content items may be determined. For example, a first content item score of the plurality of content item scores may be associated with the first content item. The plurality of content item scores may be determined based upon the plurality of transmission probabilities, the plurality of conversion probabilities and/or a plurality of bid values associated with the plurality of content items. For example, the plurality of bid values may be determined based upon budgets (e.g., daily budgets) and/or target spend patterns associated with the plurality of content items. For example, the plurality of bid values and/or the budgets may be received from devices associated with entities (e.g., advertisers, companies, brands, organizations, etc.) associated with the plurality of content items. In some examples, the plurality of bid values may comprise a first bid value associated with the first content item. One or more operations (e.g., mathematical operations) may be performed using the plurality of transmission probabilities, the plurality of conversion probabilities and/or the plurality of bid values to determine the plurality of content item scores. For example, the first content item score associated with the first content item may be determined by performing one or more operations (e.g., mathematical operations) using the first transmission probability, the first conversion probability and/or the first bid value (e.g., the first transmission probability, the first conversion probability and/or the first bid value may be combined to determine the first content item score). In some examples, the first content item may be selected from the plurality of content items based upon a determination that the first content item score associated with the first content item is higher than other content item scores of the plurality of content item scores (and/or that the first content item score is the highest content item score of the plurality of content item scores).

At 406, content may be generated based upon the first network profile, the plurality of topic-related network profiles, the plurality of device type-related network profiles, the plurality of combination network profiles and/or the influence data structure. In some examples, the content may comprise the first content item selected for presentation via the third device. In some examples, the content may be generated based upon the platform associated with the first internet resource. For example, a format and/or a structure of the content may be generated in accordance with the platform associated with the first internet resource. At 408, the first content item may be transmitted to the third device. For example, the content may be presented via the third device. In an example, the first content item may be presented via the first internet resource on the third device, such as while the first internet resource is accessed and/or displayed.

Figure 5H:
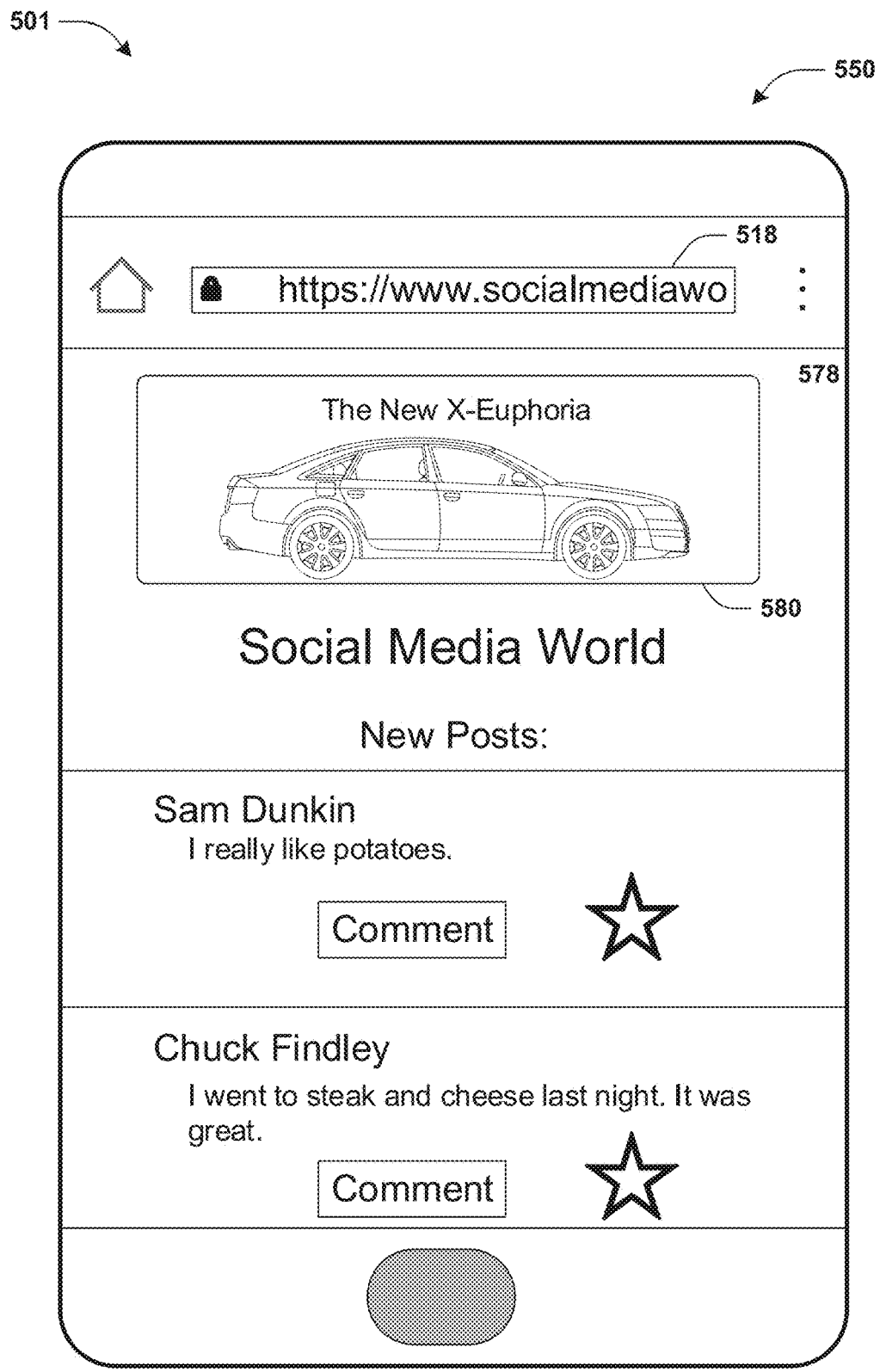
FIG. 5H is a component block diagram illustrating an example system for generating a network profile associated with devices and/or transmitting content to devices based upon the network profile, where a third client device presents and/or accesses a third web page.

FIG. 5H illustrates an exemplary scenario in which the third device corresponds to the third client device 550 and/or the third client device 550 presents and/or accesses a third web page 578. The first internet resource may correspond to the third web page 578. In an example, the third web page 578 may comprise a social media interface associated with the social media platform. The first content item may comprise a graphical object 580 (e.g., an advertisement). In some examples, the graphical object 580 may be presented via the third web page 578 while the third web page 578 is accessed and/or displayed.

Alternatively and/or additionally, a rate of transmission at which content items, associated with a topic of the plurality of topics, are transmitted to the third device may be determined based upon the first network profile, the plurality of topic-related network profiles, the plurality of data type-related network profiles, the plurality of combination network profiles and/or the influence data structure. For example, the rate of transmission may correspond to a quantity of transmissions of content items associated with the topic per unit of time. Transmission of content items associated with the topic to the third device based upon the rate of transmission may be configured for increasing a probability that the third device transmits information, related to the topic, to other devices.

Alternatively and/or additionally, a quantity of transmissions of content items, associated with a topic of the plurality of topics, to the third device may be determined based upon the first network profile, the plurality of topic-related network profiles, the plurality of data type-related network profiles, the plurality of combination network profiles and/or the influence data structure. Transmissions of content items associated with the topic to the third device, amounting to the quantity of transmissions, may be configured for increasing a probability that the third device transmits information, related to the topic, to other devices.

In some examples, the network profile may be used to determine value associated the first device of the plurality of devices. In some examples, the value may correspond to a payment value based upon provided data, provided by the first device, used for performance of one or more actions. For example, the one or more actions may result in revenue. The value may be determined based upon an amount of data of the provided data, a usefulness of the provided data for performance of the one or more actions and/or the revenue.

The network profile may be analyzed based upon the first device to identify the provided data. In an example, the provided data may be indicative of at least one of user activity performed via the first device, blogs and/or social media posts produced the first device, searches performed via the first device, consumed content items (e.g., articles, videos, audio files, images, web pages, advertisements, emails, messages, etc. consumed via the first device), accessed content items, selected content items, etc.

In an example, performance of the one or more actions may comprise selecting one or more content items (e.g., advertisements and/or a different type of content) for presentation via one or more devices (such as the first device). For example, the one or more content items may be selected based upon the provided data. For example, the provided data (and/or other data provided by other devices) may be analyzed to determine whether one or more users associated with the one or more devices have an interest in the one or more content items. The one or more content items may be selected for presentation via the one or more devices based upon a determination that the one or more users associated with the one or more devices have an interest in the one or more content items.

In an example, performance of the one or more actions may comprise trading one or more shares in an equity market. For example, the provided data (and/or other data provided by other devices) may be analyzed to determine whether to buy or sell shares of a business. For example, the provided data (and/or other data provided by other devices) may be analyzed to determine a popularity of the business, a purchase rate associated with the business, an amount of revenue associated with the business, a rate at which products and/or services of the business are returned, a rate at which services and/or subscriptions associated with the business are cancelled, etc., such as based upon indications of user activity related to the business within the provided data (and/or other data provided by other devices). The indications of user activity may comprise blogs and/or social media posts related to the business, searches related to the business, consumed content items related to the business, accessed content items related to the business, selected content items related to the business, emails related to the business, etc.

In an example, performance of the one or more actions may comprise performing a clinical trial and/or developing one or more medical products. For example, a clinical trial may be performed and/or one or more medical products may be developed based upon the provided data (and/or other data provided by other devices). In some examples, the provided data (and/or other data provided by other devices) may comprise medical records, such as genealogical data, medical data and/or genetic data associated with individuals. The clinical trial may be performed and/or the one or more medical products may be designed based upon the medical records.

In some examples, using the provided data for performance of the one or more actions may be based upon an authorization message received from the first device. For example, the authorization message may provide authorization to use data, associated with one or more types of data, for performance of one or more types of actions. The one or more types of data may correspond to at least one of email data, search data, content selection data, medical history data, etc. Alternatively and/or additionally, the one or more types of actions may correspond to at least one of developing medicine using the provided data, advertisement selection using the provided data, trading shares in an equity market, etc.

A first value associated with performance of the one or more actions may be determined. In some examples, the first value may be determined based upon an amount of revenue (and/or a predicted amount of revenue) associated with performance of the one or more actions. For example, the amount of revenue (and/or the predicted amount of revenue) may correspond to revenue received as a result of performing the one or more actions. In some examples, the first value may correspond to the amount of revenue (and/or the predicted amount of revenue). Alternatively and/or additionally, the first value may be determined based upon a cost of performance of the one or more actions and/or a predicted cost of performance of the one or more actions (e.g., expenses and/or work associated with performing the one or more actions). In an example, the first value may be determined by performing one or more operations (e.g., mathematical operations) using the amount of revenue (and/or the predicted amount of revenue) and/or the cost (and/or the predicted cost). For example, the first value may correspond to the amount of revenue (and/or the predicted amount of revenue) subtracted by the cost (and/or the predicted cost).

A first payment value associated with the first device and/or the provided data may be determined based upon the first value and/or a comparison of the provided data used for performance of the one or more actions with a total amount of data used for performance of the one or more actions. For example, the first payment value may be determined by performing one or more operations (e.g., mathematical operations) using the first value and/or a proportion of the total amount of data that the first device contributed. Alternatively and/or additionally, the first payment value may be determined based upon a usefulness of the provided data for performance of the one or more actions.

A first payment associated with the first payment value may be transferred to a first account (e.g., a banking account, a debit account, a credit account, an address associated with a cryptocurrency account, a cryptocurrency wallet, etc.) associated with the first device. For example, the first payment may be transferred to the first account automatically. Alternatively and/or additionally, a payment document (such as a check) may be automatically printed and/or issued based upon the first payment value. In some examples, the payment document may be printed based upon stored identification information associated with the first device (e.g., the stored identification information may comprise one or more of a name of the first user and/or a business associated with the first device, an account number associated with the first device, etc.). In some examples, the payment document may be sent (e.g., shipped) to a mailing address associated with the first device (e.g., the mailing address may be determined based upon the stored identification information). In some examples, an amount of the first payment may correspond to the first payment value (e.g., if the first payment value is indicative of $100, the first payment may correspond to a payment of $100 to the first account associated with the first device).

In some examples, the first network profile may be used for determining and/or monitoring a threat level associated with activity of the plurality of devices and/or alerting one or more devices responsive to a threat level exceeding a threshold threat level. For example, the first network profile may be analyzed to determine a plurality of activity patterns associated with the plurality of devices. Threat levels associated with devices of the plurality of devices may be determined and/or monitored based upon the plurality of activity patterns.

For example, the plurality of activity patterns may comprise a first activity pattern associated with one or more devices, of the plurality of devices, comprising the first device. For example, the first activity pattern may be indicative of one or more sets of device behavior associated with one or more sets of conditions. For example, a set of conditions of the one or more sets of conditions may correspond to a time of day, a day of the week, a holiday, weather, a location of the first device, etc. In an example, a set of conditions may correspond to Monday and/or a first location (e.g., a location of an office building). In the example, the set of conditions may be met when it is Monday and/or when a device of the one or more devices are at the first location. A set of device behavior of the one or more sets of device behavior may correspond to a quantity of transmissions of data performed by the first device when a set of conditions of the one or more sets of conditions are met, a rate at which transmissions of data are performed by the first device when the set of conditions are met, a quantity of receptions of data by the first device when the set of conditions are met, a rate at which receptions of data by the first device occur when the set of conditions are met, one or more devices (e.g., client devices, servers, etc.) from which the first device receives data when the set of conditions are met, one or more devices to which the first device transmits data when the set of conditions are met, etc.

In some examples, second activity associated with the first device may be monitored. The second activity may be compared with the first activity pattern to determine a first difference between the second activity and the first activity pattern. A threat level, associated with the second activity, may be determined based upon the first difference. A notification may be generated based upon the threat level (e.g., the notification may be indicative of the threat level and/or the first difference). Alternatively and/or additionally, the notification may be transmitted to the first device. Alternatively and/or additionally, the notification may be transmitted to one or more different devices, such as a security device configured to secure a network associated with the first device. Alternatively and/or additionally, the notification may be transmitted to a network security administration device associated with network security administration in charge of securing the network. Alternatively and/or additionally, the notification may be transmitted to a listener that monitors activity associated with the first device and/or that monitors activity on the network. In some examples, the notification may be generated and/or transmitted to the first device, the security device, the network security administration device and/or the listener responsive to determining that the threat level exceeds a threshold threat level.

For example, the one or more sets of conditions may be analyzed to determine that a first set of conditions of the one or more sets of conditions are met. The first activity pattern may be indicative of a first set of device behavior associated with the first set of conditions. The second activity may be compared with the first set of device behavior to determine the first difference. For example, the first difference may be indicative of a difference between a transmission rate indicated by the first set of device behavior and a rate at which transmissions are performed by the first device when performing the second activity. In an example, an increase in data transmissions may be indicative of a probability (e.g., a high probability) of information being transmitted for malicious intentions (e.g., a malicious entity, such as malware, a hacker, etc. may be controlling the first device to transmit information, such as confidential information, to a different device). For example, the threat level may be greater than the threshold threat level based upon detection of the increase in data transmissions. The notification may comprise an indication of the increase in data transmissions by the first device.

Alternatively and/or additionally, the first difference may be indicative of a difference between a reception rate indicated by the first set of device behavior and a rate at which receptions by the first device occur when performing the second activity. In an example, an increase in data receptions may be indicative of a probability (e.g., a high probability) of information being received for malicious intentions (e.g., a malicious entity, such as malware, a hacker, etc. may be controlling the first device to retrieve information, such as confidential information, from one or more devices of a network). For example, the threat level may be greater than the threshold threat level based upon detection of the increase in data receptions. The notification may comprise an indication of the increase in data receptions by the first device.

Alternatively and/or additionally, the first difference may be indicative of the first device communicating with one or more different devices that are different than indicated devices indicated by the first set of device behavior (e.g., the indicated devices may correspond to devices that the first device normally communicates with when the first set of conditions are met). In an example, communication of the first device with the one or more different devices different than the indicated devices may be indicative of a probability (e.g., a high probability) that information is being transmitted and/or received for malicious intentions. For example, the threat level may be greater than the threshold threat level based upon detection of communication of the first device with the one or more different devices. The notification may comprise an indication of the one or more different devices.

In an example, the one or more different devices may comprise a device that is connected to a network associated with the first device. The device may be connected to the network without authorization from a network security administrator and/or may be configured to perform malicious actions, such as install programs onto devices of the network without authorization and/or retrieve information, such as confidential information, from one or more devices of the network. The device may be detected by analyzing the second activity to identify communications between the device and one or more devices of the plurality of devices (such as the first device).

In an example, the first user and/or the first device may normally retrieve information from the indicated devices. For example, the first user may be an employee and/or the indicated devices that the first device normally performs communications with comprises a database of information associated with a job description of the first user (e.g., the first user may be an accountant and/or the database of information may comprise accounting information that the first user uses to perform one or more duties that are a part of the job description). The one or more different devices may comprise a second database information that is not associated with the job description of the first user (e.g., the second database information may comprise human resource department information that the first user is not authorized to access). The second activity may comprise reception of data from the one or more different devices. The reception of data from the one or more different devices may be an indication that information is being received for malicious intentions. The notification may comprise an indication of the reception of data by the first device from the one or more different devices.

Alternatively and/or additionally, the first difference may be indicative of a device communicating with one or more devices of the plurality of devices using a different connection type different than indicated connection types indicated by the first set of device behavior (e.g., the indicated connection types may correspond to connection types, such as network protocols and/or network types that the plurality of devices normally use for communication when the first set of conditions are met). In an example, the indicated connection types may correspond to Ethernet connections and/or the different connection type may correspond to a powerline connection (e.g., a powerline network using a powerline protocol for communications). The addition of the different connection type, such as without authorization from a network security administrator, may be indicative of a probability (e.g., a high probability) of the different connection type being used for malicious intentions. For example, the threat level may be greater than the threshold threat level based upon detection of the different connection type. The notification may comprise an indication of the different connection type.

In some examples, the first network profile may be generated based upon network traffic of one or more host devices of the plurality of devices. The one or more host devices may host a plurality of components (e.g., an application, a mobile application, a client application, a caching component used to cache data of a service, a microservice, etc.) of a plurality of services. In some examples, network traffic of the one or more host devices may be analyzed based upon the plurality of components. For example, network activity (such as transmissions of data and/or receptions of data) performed in association with each component of the plurality of components may be identified.

The first network profile may be generated based upon network activity associated with each component of the plurality of components. For example, the first network profile may be indicative of transmission metrics associated with each component of the plurality of components. In an example, the first network profile may be indicative of a rate at which a first host device of the one or more host devices performs transmissions in association with a first component of the plurality of components and/or a quantity of transmissions of data performed by the first host device in association with the first component. Alternatively and/or additionally, the first network profile may be indicative of reception metrics associated with each component of the plurality of components. In an example, the first network profile may be indicative of a rate at which receptions of data by the first host device occur in association with the first component and/or a quantity of receptions of data by the first host device in association with the first component.

In an example, the first component may be associated with an email application and/or one or more email services. Transmissions and/or receptions of data by the first host device in association with the first component may correspond to transmissions and/or receptions of email data for providing the one or more email services to devices having email accounts associated with the email application. Alternatively and/or additionally, the first component may be associated with a different type of application (different than an email application) and/or one or more different types of services (different than email services).

In some examples, the first network profile may comprise a plurality of sets of communication information associated with communications performed by the first host device in association with the first component. For example, a set of communication information of the plurality of sets of communication information may be associated with a communication by the first host device with a different device performed in association with the first component, where the set of communication information is indicative of a transmitting device of a communication, a receiving device of the communication, a location associated with the different device and/or the communication being performed in association with the first component (e.g., the communication is performed for providing one or more services associated with the first component to the different device).

In an example, the location of the different device may be determined based upon a network node, such as a cellular base station and/or a different edge node, to which the different device is connected (e.g., the different device may be within a coverage area of the network node, where the coverage area may correspond to an area within which the network node provides cellular coverage to cellular devices, such as the different device). For example, it may be determined that the different device is within the coverage area based upon the different device being connected to the network node. Alternatively and/or additionally, the location of the different device may be determined using one or more different location techniques, such as using satellite navigation information (e.g., information received from a global navigation satellite system (GNSS), such as GPS), using received signal strength indicators (RSSIs) associated with communications between the different device and a network, using angle of arrival (AoA) information, etc.

In an example where the first network traffic comprises a transmission of data by the first host device to a different device in association with the first component, a first set of communication information of the plurality of sets of communication information may be associated with the transmission of data. The first set of communication information may comprise an indication that the first host device is a transmitting device of the transmission of data, an indication that the different device is a receiving device of the transmission of data, an indication of a location of the different device and/or an indication that the transmission of data is performed in association with the first component (e.g., an indication that the transmission of data is performed for providing one or more services associated with the first component to the different device).

Accordingly, the first network profile may be indicative of a plurality of different devices with which the first host device communicates in association with the first component. Alternatively and/or additionally, the first network profile may be indicative of a plurality of locations associated with the plurality of different devices. Alternatively and/or additionally, the first network profile may be indicative of communication information associated with communications performed by the first host device in association with other components (different than the first component) of the plurality of components.

In some examples, the plurality of activity patterns may comprise a second activity pattern associated with the first host device. The second activity pattern may be indicative of a set of device behavior associated with the first host device. For example, the set of device behavior may be determined based upon communications performed by the first host device in association with the plurality of components, such as a summation of communications performed by the first host device in association with each component of the plurality of components. For example, the set of device behavior may be indicative of a quantity of transmissions of data by the first host device, a rate at which transmissions of data are performed by the first host device, a quantity of receptions of data by the first host device, a rate at which receptions of data by the first host device occur, different devices with which the first host device communicates, locations of the different devices with which the first host device communicates, etc.

In some examples, third activity associated with the first host device may be monitored. The third activity may be compared with the second activity pattern, such as the set of device behavior, to determine a second difference between the third activity and the second activity pattern (e.g., the second difference may be determined using one or more of the techniques presented herein). A second threat level, associated with the third activity, may be determined based upon the second difference. A notification may be generated based upon the second threat level (e.g., the notification may be indicative of the second threat level and/or the second difference). Alternatively and/or additionally, the notification may be transmitted to the first host device. Alternatively and/or additionally, the notification may be transmitted to one or more different devices, such as a security device configured to secure a network associated with the first host device. Alternatively and/or additionally, the notification may be transmitted to a network security administration device associated with network security administration in charge of securing the network. Alternatively and/or additionally, the notification may be transmitted to a listener that monitors activity associated with the first device and/or that monitors activity on the network. In some examples, the notification may be generated and/or transmitted to the first host device, the security device, the network security administration device and/or the listener responsive to determining that the second threat level exceeds a threshold threat level.

In some examples, the second activity pattern may be indicative of a plurality of sets of device behavior performed by the first host device in association with the plurality of components. For example, each set of device behavior of the plurality of sets of device behavior may be determined based upon communications performed by the first host device in association with a component (and/or multiple components) of the plurality of components.

For example, a second set of device behavior of the plurality of sets of device behavior may be associated with the first component. The second set of device behavior may be determined based upon communications performed by the first host device in association with the first component (e.g., the second set of device behavior may be determined based upon the plurality of sets of communication information associated with communications performed by the first host device in association with the first component). In some examples, the second set of device behavior may be indicative of a quantity of transmissions of data by the first host device in association with the first component, a rate at which transmissions of data are performed by the first host device in association with the first component, a quantity of receptions of data by the first host device in association with the first component, a rate at which receptions of data by the first host device occur in association with the first component, the plurality of different devices with which the first host device communicates in association with the first component, the plurality of locations of the plurality of different devices, etc.

In some examples, the third activity associated with the first host device may be analyzed to identify fourth activity of the first host device performed in association with the first component. The fourth activity may be compared with the second set of device behavior to determine a third difference between the fourth activity and the second set of device behavior associated with the first component (e.g., the third difference may be determined using one or more of the techniques presented herein). A third threat level, associated with the fourth activity, may be determined based upon the third difference. A notification may be generated based upon the third threat level (e.g., the notification may be indicative of the third threat level and/or the third difference). In some examples, the notification may be transmitted to the first host device. Alternatively and/or additionally, the notification may be transmitted to one or more different devices, such as the security device. Alternatively and/or additionally, the notification may be transmitted to the network security administration device. Alternatively and/or additionally, the notification may be transmitted to the listener. Alternatively and/or additionally, the notification may be transmitted to one or more client devices and/or one or more host devices associated with a provider of a service associated with the first component. In some examples, the notification may be generated and/or transmitted to the first host device, the security device, the network security administration device, the one or more client devices and/or the one or more host devices responsive to determining that the third threat level exceeds a threshold threat level.

In some examples, a failover procedure associated with the first host device and/or the first component may be performed based upon the first network profile. For example, the failover procedure may comprise deploying one or more computing programs and/or data for performance of one or more services associated with the first component at one or more second host devices, different than the first host device. In some examples, network traffic information associated with the first host device, activity information associated with the first host device and/or a state of the first host device may be analyzed to determine a probability of failure of the first host device (e.g., the network traffic information may be determined based upon the first network profile and/or the activity information may be determined by analyzing activity of the first host device). For example, the probability of failure may be determined based upon a level of stress on the first host device, a rate at which the first host device performs transmissions of data and/or receptions of data, a rate at which the first host device performs operations (e.g., computing operations), etc. In some examples, the failover procedure may be performed responsive to determining that the probability of failure exceeds a threshold probability of failure.

In some examples, the one or more second host devices may be identified (and/or selected) based upon the first network profile and/or the second set of device behavior associated with the first component. For example, the first network profile may be analyzed based upon the first component to identify the plurality of sets of communication information associated with communications performed by the first host device in association with the first component. Alternatively and/or additionally, the first network profile may be analyzed to identify the plurality of different devices with which the first host device communicates in association with the first component. Alternatively and/or additionally, the first network profile may be analyzed to identify the plurality of locations associated with the plurality of different devices.

In some examples, the one or more second host devices may be selected based upon the plurality of sets of communication information, the plurality of different devices and/or the plurality of locations associated with the plurality of different devices. For example, the one or more second host devices may be selected based upon a determination that the one or more second host devices are able to perform transmissions of data in association with the first component to devices at the plurality of locations at a rate of transmission that meets a threshold rate of transmission. The threshold rate of transmission may be determined based upon the rate at which the first host device performs transmissions in association with the first component to the plurality of different devices at the plurality of locations. Alternatively and/or additionally, the one or more second host devices may be selected based upon a determination that the one or more second host devices are able to process receptions of data in association with the first component from devices at the plurality of locations at a rate of reception that meets a threshold rate of reception. The threshold rate of reception may be determined based upon the rate at which receptions of data by the first host device occur in association with the first component from the plurality of different devices at the plurality of locations.

In some examples, a required computing power required for the one or more second host devices to perform one or more services associated with the first component may be determined. For example, an indication of the required computing power may be received from a device associated with a provider of the one or more services. Alternatively and/or additionally, activity information associated with the first host device may be analyzed to determine a computing rate at which the first host device performs operations (e.g., computing operations) in association with the first component. The required computing power may be determined based upon the computing rate. The one or more second host devices may be selected based upon a determination that a computing power of the one or more second host devices exceeds the required computing power (e.g., the computing power of the one or more second host devices may correspond to a computing power that the one or more second host devices can dedicate to performance of the one or more services associated with the first component).

In some examples, one or more latency requirements and/or one or more speed requirements associated with performance of the one or more services associated with the first component may be determined. For example, the one or more latency requirements and/or the one or more speed requirements may be received from a device associated with the provider of the one or more services. In some examples, a latency and/or a speed with which the one or more second host devices can communicate with devices in association with the first component may be determined based upon the plurality of locations of the plurality of different devices (e.g., a latency and/or a speed may be determined based upon a distance between a host device of the one or more second host devices and a location of the plurality of locations). The one or more second host devices may be selected based upon a determination that the one or more second host devices are able to perform transmissions of data in association with the first component to devices at the plurality of locations in accordance with the one or more latency requirements and/or the one or more speed requirements. Alternatively and/or additionally, the one or more second host devices may be selected based upon a determination that the one or more second host devices are able to perform receptions of data in association with the first component from devices at the plurality of locations in accordance with the one or more latency requirements and/or the one or more speed requirements. In an example, a host device at a network node (e.g., a cellular base station and/or a different edge node within a mobile edge computing network architecture and/or a multi-access edge computing (MEC) network architecture) may be selected as a host device of the one or more second host devices based upon a determination that at least some of the plurality of locations are within a coverage area associated with the network node and/or that communications by the network node meets the one or more latency requirements and/or the one or more speed requirements.

In some examples, the one or more computing programs and/or the data for performance of the one or more services of the first component may be deployed at the one or more second host devices responsive to determining that the probability of failure exceeds a threshold probability of failure. Alternatively and/or additionally, one or more instructions associated with performance of the one or more services may be transmitted to the one or more second host devices responsive to determining that the probability of failure exceeds a threshold probability of failure. In an example, the one or more computing programs and/or the data may comprise the one or more instructions. In an example, the one or more second host devices may perform operations associated with the first component and/or the one or more services using the one or more computer programs and/or the data (such as by executing the one or more instructions).

Alternatively and/or additionally, identification and/or selection of the one or more second host devices may be performed independently of the failover procedure. Alternatively and/or additionally, the one or more computing programs and/or the data (associated with performance of the one or more services and/or the first component) may be deployed at the one or more second host devices independently of the failover procedure. For example, the one or more computing programs and/or the data may be deployed at the one or more second host devices to reduce costs, increase efficiency and/or increase a speed of performance of the one or more services associated with the first component. In an example, the one or more computing programs and/or the data may be deployed at the one or more second host devices responsive to determining that a computing power of the first host device does not meet the required computing power (and/or that the required computing power is modified to exceed the computing power of the first host device). In an example, the one or more computing programs and/or the data for performance of the one or more services of the first component may be deployed at the one or more second host devices responsive to determining that transmission and/or reception of data by the first host device is performed with a latency that exceeds a threshold latency (and/or is performed with a speed that is less than a threshold speed). The threshold latency and/or the threshold speed may be determined based upon the one or more latency requirements and/or the one or more speed requirements associated with performance of the one or more services.

Implementation of at least some of the disclosed subject matter may lead to benefits including, but not limited to, more accurate and precise transmission of content to intended users (e.g., as a result of automatically determining influence scores associated with client devices, as a result of transmitting content to a client device based upon one or more influence scores associated with the client device and/or one or more different client devices, where the content is selected for transmission to the client device such that a likelihood is increased that data related to the content is transmitted by the client device to the one or more different client devices in response to receiving the content and/or a likelihood that the one or more different client devices react to the data is increased, etc.).

Alternatively and/or additionally, implementation of the disclosed subject matter may lead to benefits including an increase in generalized revenue for presenting content items via client devices (e.g., as a result of automatically determining influence scores associated with client devices, as a result of transmitting content to a client device based upon one or more influence scores associated with the client device and/or one or more different client devices, where the content is selected for transmission to the client device such that a likelihood is increased that data related to the content is transmitted by the client device to the one or more different client devices in response to receiving the content and/or a likelihood that the one or more different client devices perform a conversion event in response to receiving the data is increased, etc.).

Alternatively and/or additionally, implementation of at least some of the disclosed subject matter may lead to benefits including a reduction in instances that client devices are hacked and/or controlled for unauthorized transmission of malicious data and/or unauthorized retrieval of data (e.g., as a result of accurately determining activity patterns associated with devices based upon network profiles, as a result of monitoring activity associated with the devices and comparing the activity with the activity patterns to determine differences between the activity and the activity patterns, as a result of determining threat levels based upon the differences, as a result of alerting one or more devices based upon the threat levels).

Alternatively and/or additionally, implementation of at least some of the disclosed subject matter may lead to benefits including preventing unauthorized access of client devices (e.g., as a result of accurately determining activity patterns associated with devices based upon network profiles, as a result of monitoring activity associated with the devices and comparing the activity with the activity patterns to determine differences between the activity and the activity patterns, as a result of determining threat levels based upon the differences, as a result of alerting one or more devices based upon the threat levels). Alternatively and/or additionally, implementation of at least some of the disclosed subject matter may lead to benefits including decreasing security resources needed to protect client devices and/or the content system from unauthorized access.

Alternatively and/or additionally, implementation of at least some of the disclosed subject matter may lead to benefits including more efficient usage of computer resources for performance of one or more services (e.g., as a result of determining measures of transmission and/or measures of reception of a first host device for performance of the one or more services based upon a network profile, as a result of determining devices that the first host device communicates with for performance of the one or more services, as a result of determining locations of the devices and/or as a result of accurately identifying one or more host devices for performance of the one or more services based upon the measures of transmission, the measures of reception, the locations, one or more computing power requirements associated with the one or more services, one or more latency requirements associated with the one or more services and/or one or more speed requirements associated with the one or more services).

In some examples, at least some of the disclosed subject matter may be implemented on a client device, and in some examples, at least some of the disclosed subject matter may be implemented on a server (e.g., hosting a service accessible via a network, such as the Internet).

Figure 6:
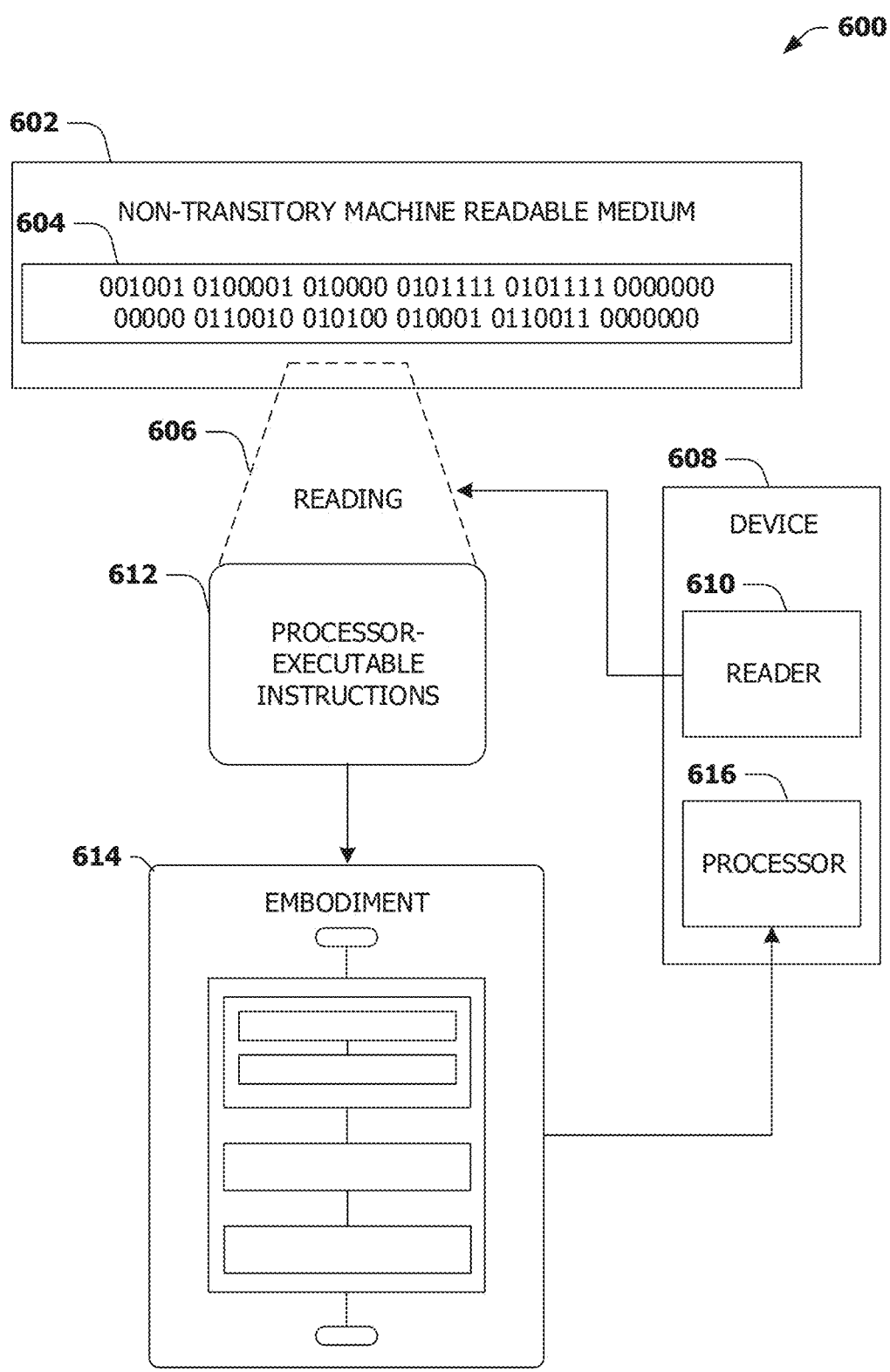
FIG. 6 is an illustration of a scenario featuring an example non-transitory machine readable medium in accordance with one or more of the provisions set forth herein.

FIG. 6 is an illustration of a scenario 600 involving an example non-transitory machine readable medium 602. The non-transitory machine readable medium 602 may comprise processor-executable instructions 612 that when executed by a processor 616 cause performance (e.g., by the processor 616) of at least some of the provisions herein (e.g., embodiment 614). The non-transitory machine readable medium 602 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disc (CD), digital versatile disc (DVD), or floppy disk). The example non-transitory machine readable medium 602 stores computer-readable data 604 that, when subjected to reading 606 by a reader 610 of a device 608 (e.g., a read head of a hard disk drive, or a read operation invoked on a solid-state storage device), express the processor-executable instructions 612. In some embodiments, the processor-executable instructions 612, when executed, cause performance of operations, such as at least some of the example method 400 of FIG. 4, for example. In some embodiments, the processor-executable instructions 612 are configured to cause implementation of a system, such as at least some of the exemplary system 501 of FIGS. 5A-5H, for example.

3. Usage of Terms

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer and/or machine readable media, which if executed will cause the operations to be performed. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein. Also, it will be understood that not all operations are necessary in some embodiments.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method, comprising:
analyzing activity of a plurality of devices to identify network traffic, wherein the network traffic comprises:
transmission of data by a first device to one or more first devices; and
reception of data by the first device from one or more second devices comprising a third device;
generating, based upon the network traffic, a network profile associated with the plurality of devices, wherein the network profile is indicative of:
one or more sets of transmission metrics, of the first device, corresponding to a measure of transmissions of data of a first communication type by the first device to the one or more first devices; and
one or more sets of reception metrics, of the first device, corresponding to a measure of receptions of data of a second communication type by the first device from the one or more second devices, wherein the second communication type is different than the first communication type;
determining a set of influence scores each indicative of an amount of influence that data transmitted from a user of the third device has on a respective user of a plurality of users, the determining comprising:
determining an influence score, indicative of a first amount of influence that data transmitted from the user of the third device to the first device has on a user of the first device, based upon the network profile indicative of the one or more sets of transmission metrics of the first device associated with the first communication type and the one or more sets of reception metrics of the first device associated with the second communication type; and
determining a second influence score, indicative of a second amount of influence that data transmitted from the user of the third device to a fourth device, different than the first device, has on a user of the fourth device, based upon a second network profile indicative of one or more second sets of transmission metrics of the fourth device associated with a third communication type and one or more second sets of reception metrics of the fourth device associated with a fourth communication type, wherein the user of the fourth device is different than the user of the first device and the second influence score is different than the influence score, wherein the fourth communication type is different than the third communication type;
providing first content in association with the user of the first device based upon the influence score; and
providing second content, different than the first content, in association with the user of the fourth device based upon the second influence score.

2. The method of claim 1, wherein:
the analyzing the activity of the plurality of devices comprises analyzing the activity based upon a first topic to identify the network traffic; and
the network traffic and the network profile are associated with the first topic.

3. The method of claim 2, comprising:
selecting, based upon the influence score, a content item associated with the first topic, wherein:

the first content is generated based upon the selecting the content item; and
the first content comprises the content item.

4. The method of claim 3, wherein:
the first amount of influence is in association with the first topic.

5. The method of claim 4, wherein:
the network profile is indicative of one or more sets of reaction metrics associated with the first device, wherein a first set of reaction metrics of the one or more sets of reaction metrics corresponds to a measure of reactions to receptions of data from the third device; and
the determining the influence score is performed based upon the first set of reaction metrics.

6. The method of claim 2, wherein the generating the network profile comprises:
analyzing the network traffic to identify a set of network traffic, associated with a first type of data, associated with the first device; and
determining the one or more sets of transmission metrics and the one or more sets of reception metrics based upon the set of network traffic.

7. The method of claim 6, comprising:
selecting, based upon the influence score, a content item associated with the first topic, wherein:
the generating the content is performed based upon the selecting the content item;
the content comprises the content item; and
the fourth device is the same as the third device; and
presenting the content item via a platform associated with the first type of data.

8. The method of claim 7, wherein:
the influence score is indicative of an amount of influence that data, associated with the first type of data, transmitted from the third device to the first device has on the user of the first device in association with the first topic.

9. The method of claim 1, comprising:
analyzing the network profile to determine a plurality of activity patterns associated with the plurality of devices, wherein the plurality of activity patterns comprises a first activity pattern associated with the first device;
monitoring second activity associated with the first device;
comparing the second activity with the first activity pattern to determine a difference between the second activity and the first activity pattern; and
determining, based upon the difference, a threat level associated with the second activity, wherein the content is indicative of the threat level.

10. The method of claim 1, wherein:
the first device is associated with one or more services; and
the one or more services are performed via the transmission of data by the first device to the one or more first devices and the reception of data by the first device from the one or more second devices, the method comprising:
identifying, based upon the network profile, one or more third devices for performance of the one or more services, wherein:
the one or more third devices comprise the fourth device;

the transmitting the content is performed responsive to the identifying the one or more third devices comprising the fourth device; and
the content comprises one or more instructions for performing the one or more services.

11. The method of claim 1, wherein at least one of:
the first communication type corresponds to email and the second communication type corresponds to social media; or
the first communication type corresponds to social media and the second communication type corresponds to email.

12. The method of claim 1, wherein:
the first communication type corresponds to one of a group of communication types comprising text messages, instant messages, social media posts, messages transmitted using a social media platform or emails; and
the second communication type corresponds to another of the group of communication types.

13. A computing device comprising:
a processor; and
memory comprising processor-executable instructions that when executed by the processor cause performance of operations, the operations comprising:
analyzing activity of a plurality of devices to identify network traffic, wherein the network traffic comprises:
transmission of data by a first device to one or more first devices; and
reception of data by the first device from one or more second devices;
generating, based upon the network traffic, a network profile associated with the plurality of devices, wherein the network profile is indicative of:
one or more sets of transmission metrics associated with the first device, wherein a first set of transmission metrics of the one or more sets of transmission metrics corresponds to a measure of transmissions of data of a first communication type, of the network traffic, to a second device of the one or more first devices; and
one or more sets of reception metrics associated with the first device, wherein a first set of reception metrics of the one or more sets of reception metrics corresponds to a measure of receptions of data of a second communication type, of the network traffic, from a third device of the one or more second devices;
determining an influence score, associated with an amount of influence of a user of the third device on a user of the first device, based upon the network profile indicative of the one or more sets of transmission metrics associated with the first device and associated with the first communication type and the one or more sets of reception metrics associated with the first device and associated with the second communication type;
determining a second influence score, associated with a second amount of influence of the user of the third device on a user of a fourth device, based upon a second network profile indicative of one or more second sets of transmission metrics associated with the fourth device and one or more second sets of reception metrics of the fourth device, wherein the second influence score is different than the influence score; and providing content to one or more users of one or more devices based upon at least one of the influence score or the second influence score.

14. The computing device of claim 13, wherein:
the first set of transmission metrics is indicative of at least one of:
a rate at which the first device performs transmissions of data to the second device of the one or more first devices; or
a quantity of transmissions of data by the first device to the second device; and
the first set of reception metrics is indicative of at least one of:
a rate at which receptions of data by the first device from the third device occur; or
a quantity of receptions of data by the first device from the third device.

15. The computing device of claim 13, wherein:
the network profile is indicative of one or more sets of reaction metrics associated with the first device, wherein a first set of reaction metrics of the one or more sets of reaction metrics corresponds to a measure of reactions to receptions of data from the third device;
the first set of reaction metrics is indicative of at least one of:
a rate at which the first device reacts to receptions of data from the third device; or
a quantity of reactions performed by the first device in response to receptions of data from the third device; and
the determining the influence score is performed based upon the first set of reception metrics and the first set of reaction metrics.

16. A non-transitory machine readable medium having stored thereon processor-executable instructions that when executed cause performance of operations, the operations comprising:
analyzing activity of a plurality of devices to identify network traffic, wherein the network traffic comprises:
transmission of data by a first device to one or more first devices; and
reception of data by the first device from one or more second devices;
generating, based upon the network traffic, a network profile associated with the plurality of devices, wherein the network profile is indicative of:
one or more sets of transmission metrics associated with the first device, wherein a first set of transmission metrics of the one or more sets of transmission metrics corresponds to a measure of transmissions of data, of the network traffic, to a second device of the one or more first devices; and
one or more sets of reception metrics associated with the first device, wherein a first set of reception metrics of the one or more sets of reception metrics corresponds to a measure of receptions of data, of the network traffic, from a third device of the one or more second devices;
analyzing the network profile, indicative of the one or more sets of transmission metrics and the one or more sets of reception metrics, to determine a first activity pattern associated with the first device, wherein the first activity pattern is indicative of both (i) the first device receiving data from at least one of a first client device or a first server when a set of conditions are met and (ii)

the first device transmitting data to at least one of a second client device or a second server when the set of conditions are met;

monitoring second activity associated with the first device, wherein the second activity is indicative of at least one of (i) the first device receiving data from a third client device different than the first client device or a third server different than the first server or (ii) the first device transmitting data to a fourth client device different than the second client device or a fourth server different than the second server;

comparing the second activity, associated with the first device, with the first activity pattern, associated with the set of conditions, to determine a difference between:
  (i) the second activity indicative of at least one of the first device receiving data from the third client device or the third server or the first device transmitting data to the fourth client device or the fourth server; and
  (ii) the first activity pattern indicative of both:
    the first device receiving data from at least one of the first client device or the first server when the set of conditions are met; and
    the first device transmitting data to at least one of the second client device or the second server when the set of conditions are met,
  wherein the difference corresponds to the first device communicating with one or more different devices that are different than one or more devices with which the first device normally communicates when the set of conditions are met;

determining, based upon the difference between the second activity and the first activity pattern, a threat level associated with the second activity;

generating a notification based upon the threat level; and transmitting the notification to at least one of the first device or a fourth device.

17. The non-transitory machine readable medium of claim 16, wherein the notification comprises an indication of the one or more different devices.

18. The non-transitory machine readable medium of claim 16, wherein the second activity is indicative of both (i) the first device receiving data from the third client device or the third server and (ii) the first device transmitting data to the fourth client device or the fourth server.

19. The non-transitory machine readable medium of claim 16, wherein the second activity is indicative of the first device receiving data from the third client device or the third server.

20. The non-transitory machine readable medium of claim 16, wherein the second activity is indicative of the first device transmitting data to the fourth client device or the fourth server.

* * * * *